(12) United States Patent
Ai et al.

(10) Patent No.: US 11,899,202 B2
(45) Date of Patent: Feb. 13, 2024

(54) EXTREME CUTOFF BEAM CONTROL OPTICS

(71) Applicant: ABL IP Holding LLC, Atlanta, GA (US)

(72) Inventors: Qi Ai, Peachtree City, GA (US); Jie Chen, Snellville, GA (US); Craig Eugene Marquardt, Covington, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 18/117,139

(22) Filed: Mar. 3, 2023

(65) Prior Publication Data
US 2023/0280585 A1 Sep. 7, 2023

Related U.S. Application Data

(63) and a continuation-in-part of application No. 17/686,799, filed on Mar. 4, 2022, now Pat. No. 11,746,989.
(Continued)

(51) Int. Cl.
*G02B 27/00* (2006.01)
*G02B 5/00* (2006.01)
(Continued)

(52) U.S. Cl.
CPC ............ *G02B 27/0012* (2013.01); *F21V 7/04* (2013.01); *G02B 3/0037* (2013.01); *G02B 5/003* (2013.01); *G02B 7/003* (2013.01); *F21Y 2115/10* (2016.08)

(58) Field of Classification Search
CPC ............ F21V 13/04; F21V 5/007; F21V 5/08; F21W 2131/103; F21S 8/086
See application file for complete search history.

(56) References Cited

U.S. PATENT DOCUMENTS

| 7,674,018 B2 | 3/2010 | Holder et al. |
| 7,934,851 B1 * | 5/2011 | Boissevain ............. F21V 29/74 362/249.02 |

(Continued)

FOREIGN PATENT DOCUMENTS

CA 2630114 A1 10/2009

OTHER PUBLICATIONS

U.S. Appl. No. 17/686,799, Non-Final Office Action, dated Dec. 22, 2022, 13 pages.
(Continued)

*Primary Examiner* — Tracie Y Green
*Assistant Examiner* — Michael Chiang
(74) *Attorney, Agent, or Firm* — Kilpatrick Townsend & Stockton LLP

(57) ABSTRACT

An optical assembly and a luminaire with extreme cutoff beam control optics. The optical assembly includes a base, a plurality of lenses, a plurality of light emitting diodes (LED) positioned to emit light into the lenses, and a reflector having a reflective surface disposed adjacent at least one of the plurality of LEDs. The optical axis of one or more of the LEDs may be offset from a central axis of the respective lens in which it emits light. The reflective surface of the reflector may extend from the base over the one or more of the LEDs and beyond the optical axis of the one or more LEDs to direct light in a desired direction or toward a selected area (e.g., a street) and cut off light directed in an undesirable direction or area (e.g., a house).

23 Claims, 20 Drawing Sheets
(3 of 20 Drawing Sheet(s) Filed in Color)

Related U.S. Application Data

(60) Provisional application No. 63/356,130, filed on Jun. 28, 2022.

(51) Int. Cl.
*F21V 7/04* (2006.01)
*G02B 7/00* (2021.01)
*G02B 3/00* (2006.01)
*F21Y 115/10* (2016.01)

(56) References Cited

U.S. PATENT DOCUMENTS

| | | | |
|---|---|---|---|
| 8,092,042 B2 * | 1/2012 | Wilcox | F21V 13/02 362/249.02 |
| 8,210,722 B2 | 7/2012 | Holder et al. | |
| 9,039,252 B2 | 5/2015 | Treanton | |
| 9,400,087 B2 | 7/2016 | Marquardt et al. | |
| 9,816,672 B1 | 11/2017 | Broughton | |
| 10,168,023 B1 | 1/2019 | Hein | |
| 10,222,027 B2 | 3/2019 | Broughton | |
| 2004/0174706 A1 * | 9/2004 | Kan | F21V 13/04 362/241 |
| 2009/0323330 A1 * | 12/2009 | Gordin | F21V 11/00 362/249.02 |
| 2010/0240158 A1 | 9/2010 | Ter-Hovhannissian | |
| 2012/0008320 A1 * | 1/2012 | Tu | F21V 11/02 362/235 |
| 2014/0063802 A1 * | 3/2014 | Garcia | F21V 5/08 362/241 |
| 2014/0133181 A1 | 5/2014 | Ishida et al. | |
| 2015/0078011 A1 * | 3/2015 | Sy | F21V 7/048 362/327 |
| 2019/0101262 A1 | 4/2019 | Jou | |
| 2021/0215308 A1 * | 7/2021 | Caprara | F21V 7/0083 |

OTHER PUBLICATIONS

U.S. Appl. No. 17/686,799, Notice of Allowance, dated Mar. 22, 2023, 10 pages.

European Application No. 231600008, Extended European Search Report dated Jul. 7, 2023, 9 pages.

\* cited by examiner

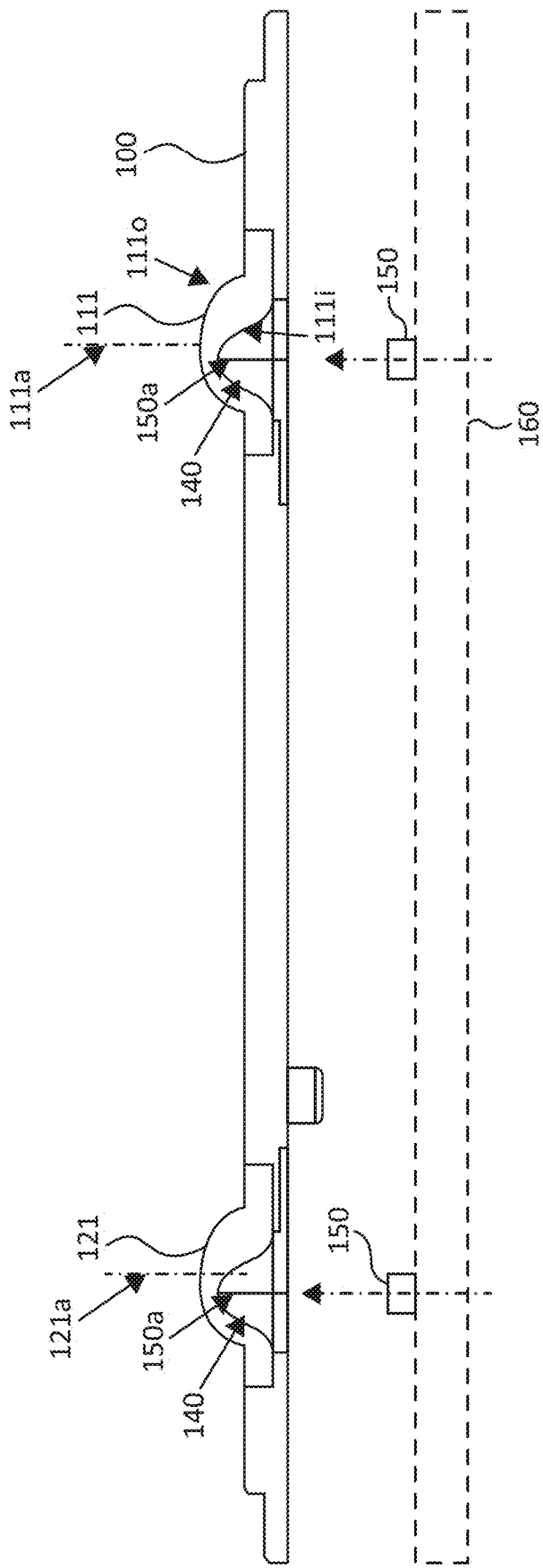

EXTREME CUTOFF BEAM CONTROL OPTICS

CROSS REFERENCE TO RELATED APPLICATIONS

The present application is a continuation-in-part of U.S. patent application Ser. No. 17/686,799, filed on Mar. 4, 2022, and claims the benefit of U.S. Patent Application No. 63/356,130, filed on Jun. 28, 2022, the subject matter of each of which is incorporated herein by reference in its entirety.

FIELD OF DISCLOSURE

This disclosure relates generally to an optical assembly that can be used in luminaires and other light elements, and more particularly to reflectors around light emitting diodes (LED) to direct light beams from LEDs in a desired direction while cutting off the light beams from travelling in an undesired direction.

BACKGROUND

Light emitting diodes (LED) are typically used in luminaires for street lighting, porch lighting, back yard lighting, in house lighting, decorative lighting, or other lighting purpose. LED lights used in roadway luminaires typically include a series of LEDs arranged in rows, with the LEDs being covered by an optic designed to provide a particular light distribution profile. In outdoor lighting applications, it may be desirable to direct light toward a desired direction (such as toward a street, parking lot, or other area), while preventing light from being directed toward an undesired direction to leave other areas, such as unpaved areas, buildings, yards, and the like, unlit. However, traditional lighting systems may not provide the ability to carefully cutoff off light such that predominately all light emitted from the lighting system is emitted in a desired direction. Therefore, improvements in light cutoff capabilities of lighting systems are desired.

BRIEF SUMMARY

One aspect of the present disclosure relates to an optical assembly configured to direct light in a desired direction. The optical assembly includes a base, a plurality of lenses disposed on the base and spaced from each other in a row. Each lens may have a dome shape with a central or optical axis perpendicular to a plane of the base. The optical assembly can include a plurality of light emitting diodes (LED). Each LED can be disposed between the base and a respective lens of the plurality of lenses. Each LED can have a central axis perpendicular to a plane of the LED. The central axis of an LED may be offset from the central axis of the respective lens of the plurality of lenses. At least one reflector having a curved surface (e.g., concave shape, parabolic shape, etc.) may be disposed adjacent to at least one of the plurality of LEDs such that the at least one of the plurality of LEDs are at a first side of the at least one reflector. The curved surface may extend from the base and curve over the at least one of the plurality of LEDs and beyond the central axis of each of the at least one of the plurality of LEDs. The curved surface can be configured to direct light emitted by the at least one of the plurality of LEDs toward the first side and prevent the light from leaking toward a second side of the at least one reflector that is opposite the first side.

In some embodiments, each lens of the plurality of lenses defines a cavity, and each LED of the plurality of LEDs may be disposed in a respective one of the cavities such that the central axis of the LED is offset relative to a central axis of the respective lens in a direction of the curved surface of the at least one reflector.

In some embodiments, the curved surface of the reflector may have a free form shape characterized by multiple curvatures between end points of the curved surface, a first end point being at the base and a second end point being positioned above at least some of the plurality of lenses. For example, a first curvature may be between the first end point at the base and an intermediate point between the first end point and the second end point, and a second curvature may be between the intermediate point and the second end point of the curved surface.

In some embodiments, the curved surface of the reflector may be characterized by a first angle between a plane of the base and a first line (e.g., joining a distal end of a lens furthest from the curved surface and a distal end of the curved surface located over the lens). For example, the first angle is in a range between 60° and 90°. In some embodiments, the curved surface of the reflector may be characterized by a second angle between the plane of the base and a second line (e.g., a line joining a point on the lens located at the central axis of the LED and the distal end of the curved surface located over the lens). For example, the second angle is in a range between 70° and 130°.

Further, one aspect of the present disclosure relates to a luminaire. The luminaire includes a base, a plurality of lenses disposed on the base and spaced from each other, a plurality of light emitting diodes (LED) disposed between the base and a respective lens of the plurality of lenses, at least one reflector having a curved surface and disposed proximate to at least one of the plurality of LEDs, and a frame supporting the base and the at least one reflector.

In some embodiments, each lens may have a dome shape having a central axis perpendicular to a plane of the base.

In some embodiments, each LED may have a central axis perpendicular to a plane of the LED, and the central axis of an LED may be offset from the central axis of a respective lens of the plurality of lenses.

In some embodiments, the curved surface of the reflector may extend from a surface of the base and curve over the at least one of the plurality of LEDs and beyond the central axis of the at least one of the plurality of LEDs. The curved surface may be configured to direct light emitted by the at least one of the plurality of LEDs toward the first side and prevent the light from leaking toward a second side of the at least one reflector that is opposite the first side.

In some embodiments, the frame may be oriented such that the curved surface of the at least one reflector curves toward the street to direct the light from the at least one of the plurality of LEDs toward a street side and prevent light from leaking in a direction that is away from the street.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and can or cannot represent actual or preferred values or dimensions. Where applicable, some or all features cannot be illustrated to assist in the description of underlying features. The patent or application file contains at least one drawing executed in color. Copies of this patent or patent application publication with color drawing(s) will be provided by the Office upon request and payment of the necessary fee. In the drawings:

FIG. 4C is a cross-section view of a lens disposed on the base showing the light source exploded from the cavity of the lens, according to one embodiment.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) can be practiced without those specific details. In some instances, well-known structures and components can be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics can be combined in any suitable manner in one or more embodiments. Further, it is intended that embodiments of the disclosed subject matter cover modifications and variations thereof.

It is to be understood that terms such as "top," "bottom," "front," "side," "length," "lower," "interior," "inner," "outer," and the like that can be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Figure 1:
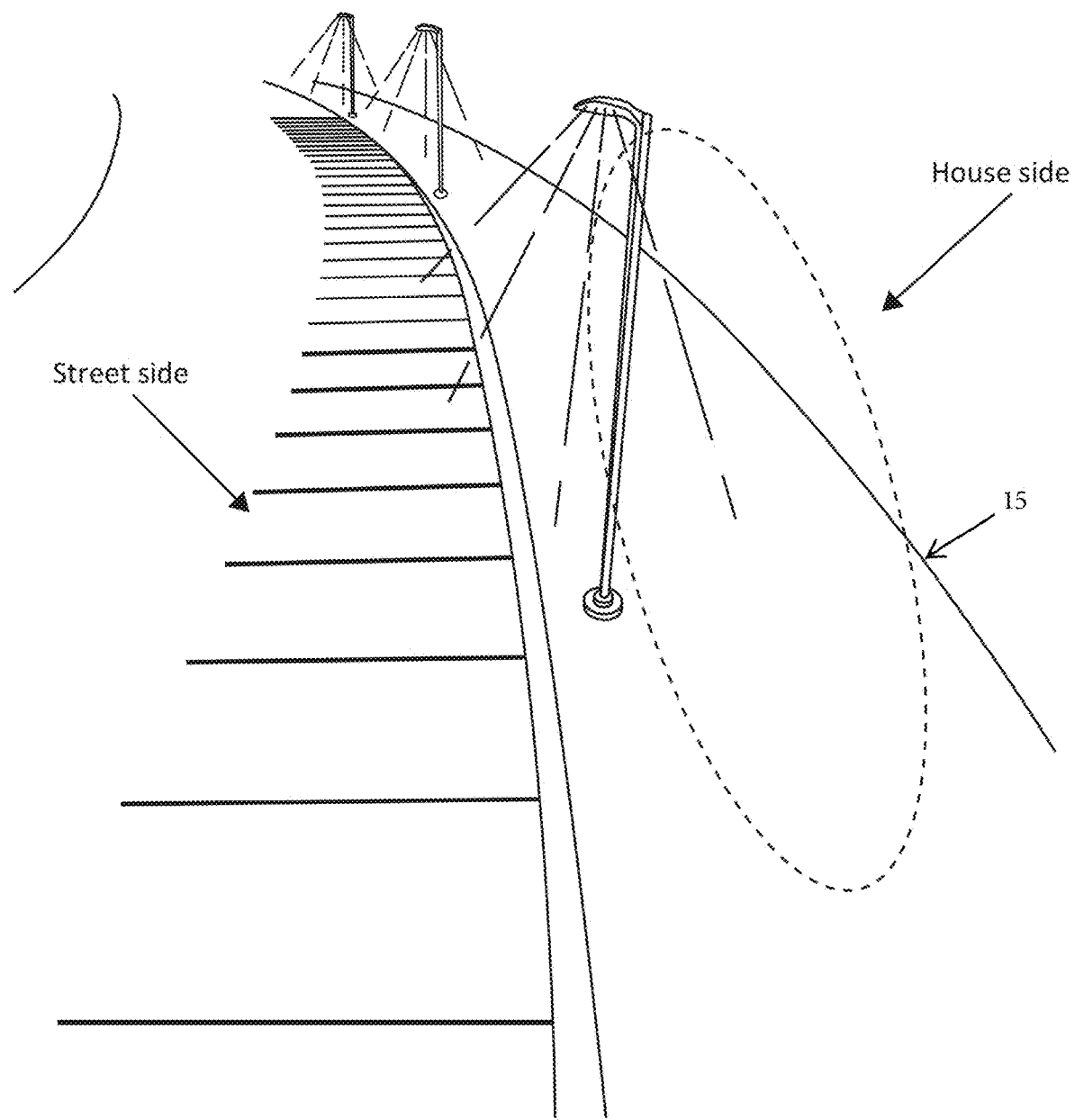
FIG. 1 illustrates backlight leakage associated with a prior art street light.

Conventional lighting applications may attempt to control an amount of back light or corner light to meet visibility/non-visibility, intensity or other specifications. However, existing back light control and corner control optics have several limitations. For example, conventional optics may not be able to produce a light distribution having a sharp and precise backlight cutoff, which may result in a backlight cutoff line which is spaced apart from a fixture installation line and may enable unwanted light to spill in an undesired direction, such as toward neighboring properties (e.g., see FIG. 1). Existing optics may also be unable to meet specification related to a LEED program such as LEED v4 program and earning additional points.

The present disclosure provides an optical assembly that overcomes several limitations above. In some embodiments, the optical assembly herein comprises a reflector frame that offers extreme light cut off while also reflecting a greater portion of light in the desired direction to improve light coverage. In some embodiments, the extreme light cut off may be characterized by mounting height to back light distance ratio. For example, if the optical assembly is mounted at a height of 20 feet, the back light cutoff will be less than 5 feet rearward of the pole. Some embodiments, ratios of back light cutoff to mounting height that are less than 0.5, less than 0.4. less than 0.3, less than 0.25, less than 0.2, less than 0.15, less than 0.1, or less may be achieved. For example, comparing a first cut off line 15 (in FIG. 1) and another cut off line 25 (in FIG. 2) shows that the cut off line 25 is much closer to the street than the house side, thereby achieving much sharper cut off using the optical assembly of the present disclosure.

Additionally, an asymmetric lens design is provided that can reduce the reflector size while offering more precise and/or sharp light cutoff. The structure of the lens can take various forms. In some non-limiting examples, the lens may include a clear optic that is co-molded into a base (e.g., a black or other colored base), a clear optic that is glued and/or otherwise secured to a base (e.g., a black or other colored base), and/or may include an integrally formed base and optic, with a surface of the base being painted or otherwise colored (e.g., black or another color). In some embodiments, the lens and/or base may include a silicone material, as silicone can offer desirable photometric and thermal performance.

Regardless of the lens material, it may be desirable for as much of the surface of the base 100 that is exposed to the emitted light (e.g., first surface 100*f* in FIG. 4A) to incorporate a light absorbing mechanism (e.g., one that absorbs at least 90% of the light that impinges upon it). As explained above, the exposed surface (e.g., first surface 100*f*) of the base 100 may be painted a dark color (e.g., black). If the lenses are formed from PMMA or another paintable material, the portion of the lenses that couple to the base 100 (e.g., that flat portion of strips 110 in FIG. 4A) can be similarly painted a dark color (e.g., black). Lenses formed of a silicone material cannot be painted. Thus, a dark (e.g., black) material (e.g., felt, paper, etc.) may be provided on the upper or lower surface of the portion of the lenses that couple to the base for light absorption. Alternatively, the clear portion of the lenses (the dome-shaped portions) can be co-molded with and/or adhered to a darker material that forms the portion of the lenses that couple to the base 100.

In some embodiments, the optical assembly comprises one or more light sources, a number of lenses (e.g., made of PMMA or silicone material) placed over the light sources, and one or more reflectors (e.g., made of pure black plastic and vacuum metalized reflective surface) placed proximate the lens. Different components of the optical assembly and their configuration are further discussed in detail with respect to FIGS. 3-15, according to some embodiments.

Figure 3:
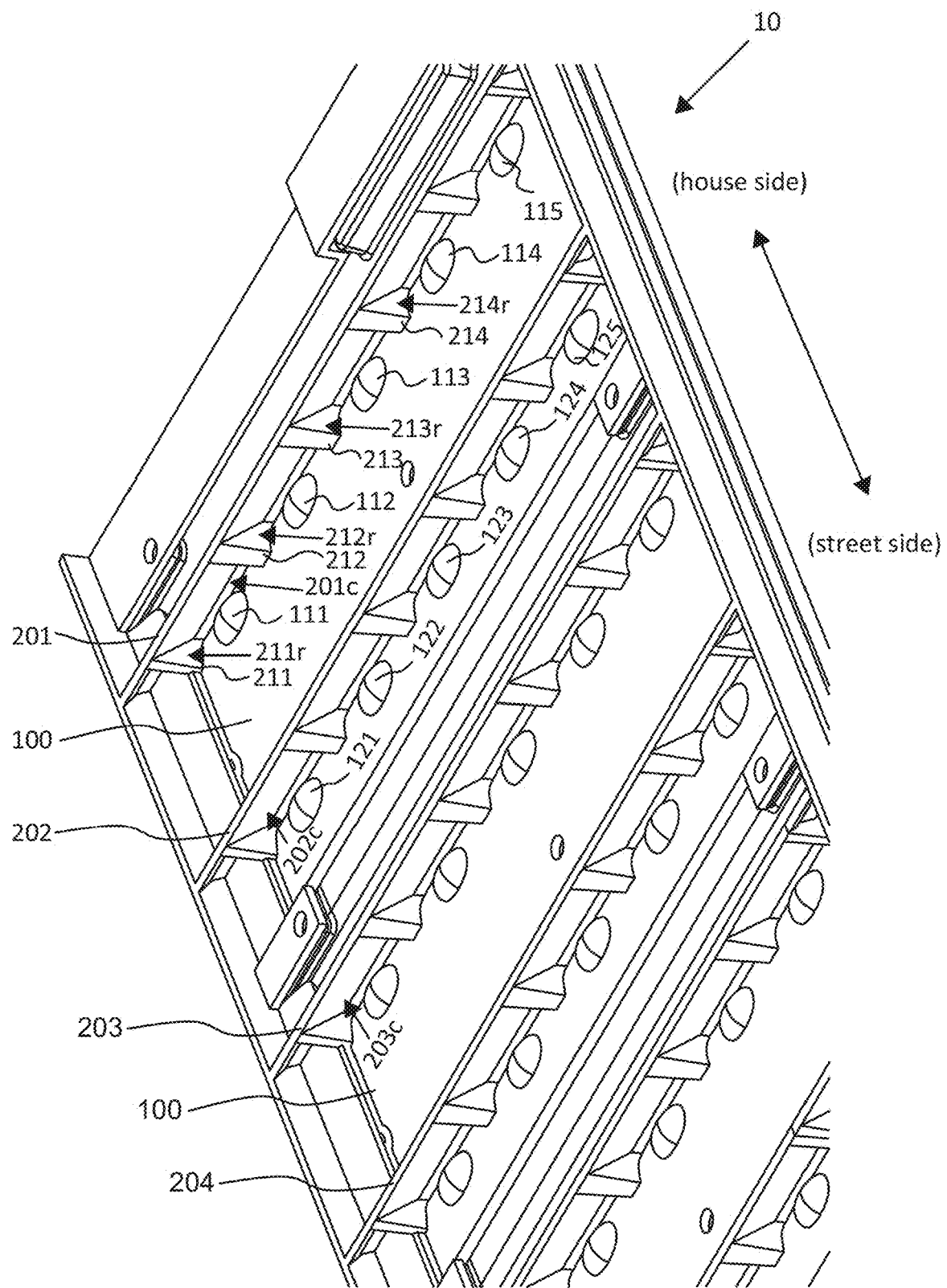
FIG. 3 is a perspective view of an optical assembly including a reflector with a curved surface, according to one embodiment.

FIG. 3 is a perspective view of an optical assembly 10, according to one embodiment. The optical assembly 10 includes a base 100, a plurality of lenses (e.g., lenses 111-115 and lenses 121-125) disposed on the base 100 and over a plurality of light sources 150 (e.g., shown in FIG. 4C), and one or more reflectors 201-204 that each have a reflector surface 201*c*-203*c* disposed adjacent to one or more of the plurality of light sources 150 and/or the plurality of lenses (e.g., lenses 111-115 and lenses 121-125). Each of reflector surfaces 201*c*-203*c* can be a reflective surface configured to reflect light from the LEDs, as such can be alternatively referred as the reflective surfaces 201*c*-203*c*. Reflector surface 201*c* may project over at least a portion of one or more of the light sources 150. In some embodiments, the reflector surface 201*c*-203*c* may be formed from one or more angled and/or curved sections so as to project upward from the base 100 and over at least of portion of one or more of the light sources 150. For example, the reflector surface 201*c* may include a single planar surface that is angled relative to the base 100 to extend over at least of portion of one or more of the light sources 150, while in other embodiments the reflector surface 201*c* may be formed from multiple planar portions that are at different angles relative to one another. In yet other embodiments, all or part of the reflector surface 201*c* may be curved, and may include a constant or varying degree of curvature. In some embodiments, the light sources 150 can be light emitting diodes (LED) 150. The reflector surface 201*c* in combination with the lenses 111-115 and LEDs 150 allows the light to be directed in a desired direction. The reflector surface 201*c* is also configured to cutoff light from traveling in undesired directions. For example, as will be discussed in greater detail below, the reflectors 201 may be positioned relative to the LEDs 150 and lenses 111-115 such that light emitted from each lens 111-115 in undesired directions may contact one of the surfaces 201*c*, which then reflects such light in a desired direction and/or otherwise away from the undesired direction. The base 100 can also prevent the light from the LEDs from traveling in other directions than the desired direction. For example, in some embodiments, the base 100 may be formed from and/or coated with a black (or other dark color) material. For example, the base 100 may absorb at least 90%, at least 91%, at least 92%, at least 93%, at least 94%, at least 95%, at least 96%, at least 97%, at least 98%, at least 99%, or more of light. This may enable the base 100 to absorb light directed toward the base 100 to prevent and/or reduce the amount of light reflected by the base 100, some of which may otherwise be reflected in an undesired direction. Light emitted from the LEDs 150 and/or lenses 111-115 in a downward direction and/or light reflected in a downward direction using the reflectors 201 may be absorbed by the base 100, which may prevent such light from being directed in an undesired direction (e.g., a house side direction). In some embodiments, the optical assembly 10 can be a luminaire used to light a street. In this example, the optical assembly is configured to project light in a desired direction (in this case, a street side), while limiting or preventing the projection of light in an undesired direction (in this case, a house side such as a front yard or a back yard or any other area that should not be illuminated/does not allow light trespass). The components of the optical assembly including the lenses, the LEDs and reflectors are further discussed in detail below.

Figure 2:
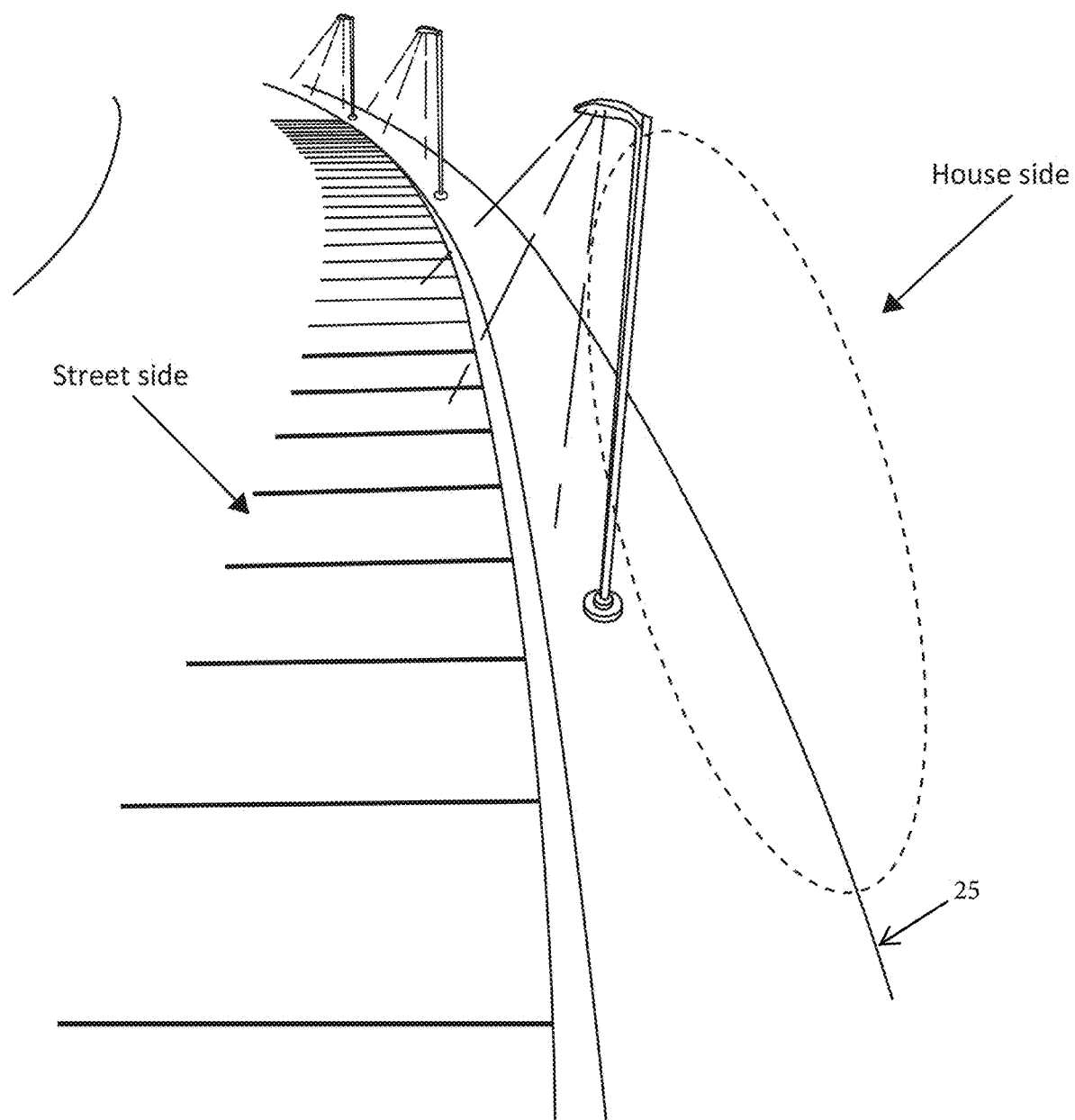
FIG. 2 illustrates a street light with improved backlight control, according to one embodiment.

A light source emits light that can be received and further distributed by the lens, as discussed herein. In some embodiments, the light source can be or can comprise one or more light emitting diodes, for example. The light source and/or the emitted light can have an associated optical axis. The light source can be deployed in applications where it is desirable to bias illumination laterally relative to the optical axis. For example, as shown in FIGS. 2 and 7B, in a street luminaire where the optical axis is pointed down towards the ground, it may be beneficial to direct light towards a street side of the optical axis, rather than towards a row of houses that are beside the street (e.g., see FIG. 2). The light source can be positioned relative to a lens that receives light propagating on one side or both sides of the optical axis and redirects that light toward the reflector and/or sends the light forward toward the street side. For example, the lens can receive light that is headed towards the houses and redirect that light towards the street via the reflector 201.

Figure 4A:
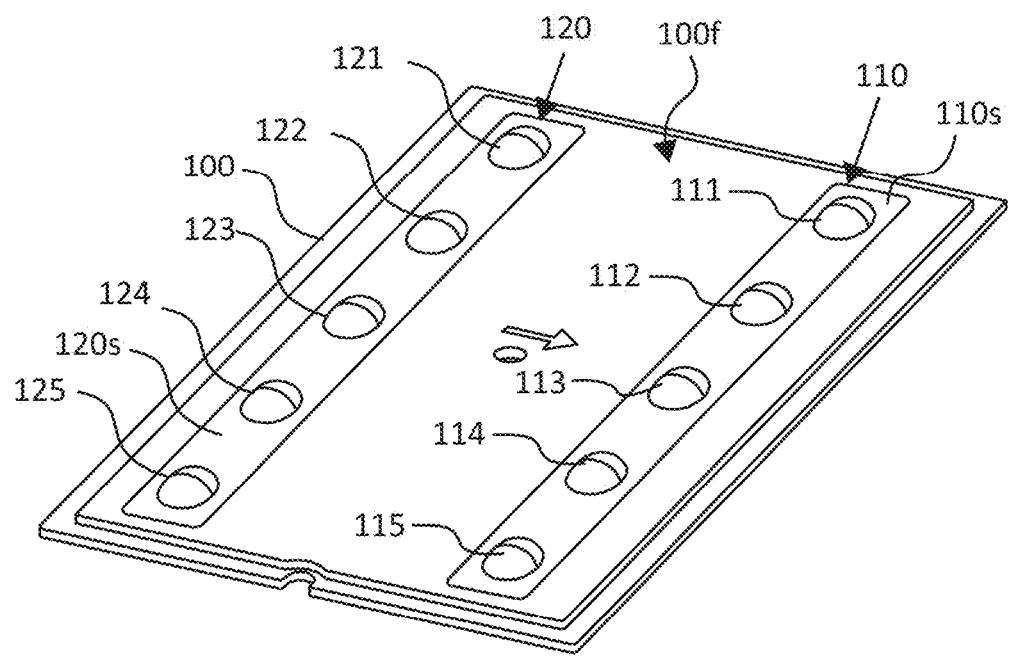
FIG. 4A is a top perspective view of a lens or optic arranged on a base surface, according to one embodiment.
Figure 4B:
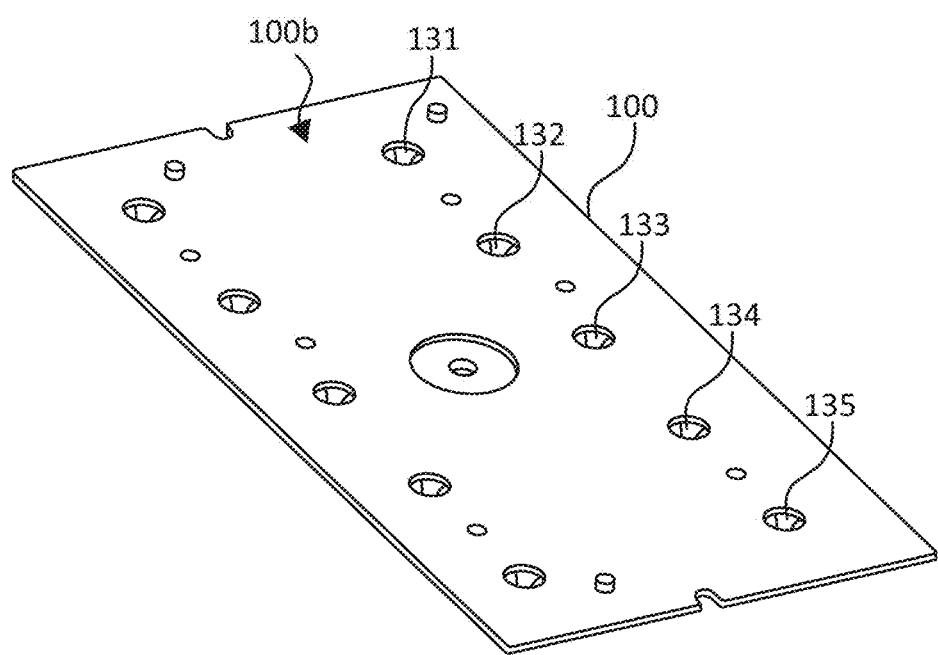
FIG. 4B is a bottom perspective view of the base surface showing access to a cavity of the lens for mounting a light source, according to one embodiment.
Figure 5:
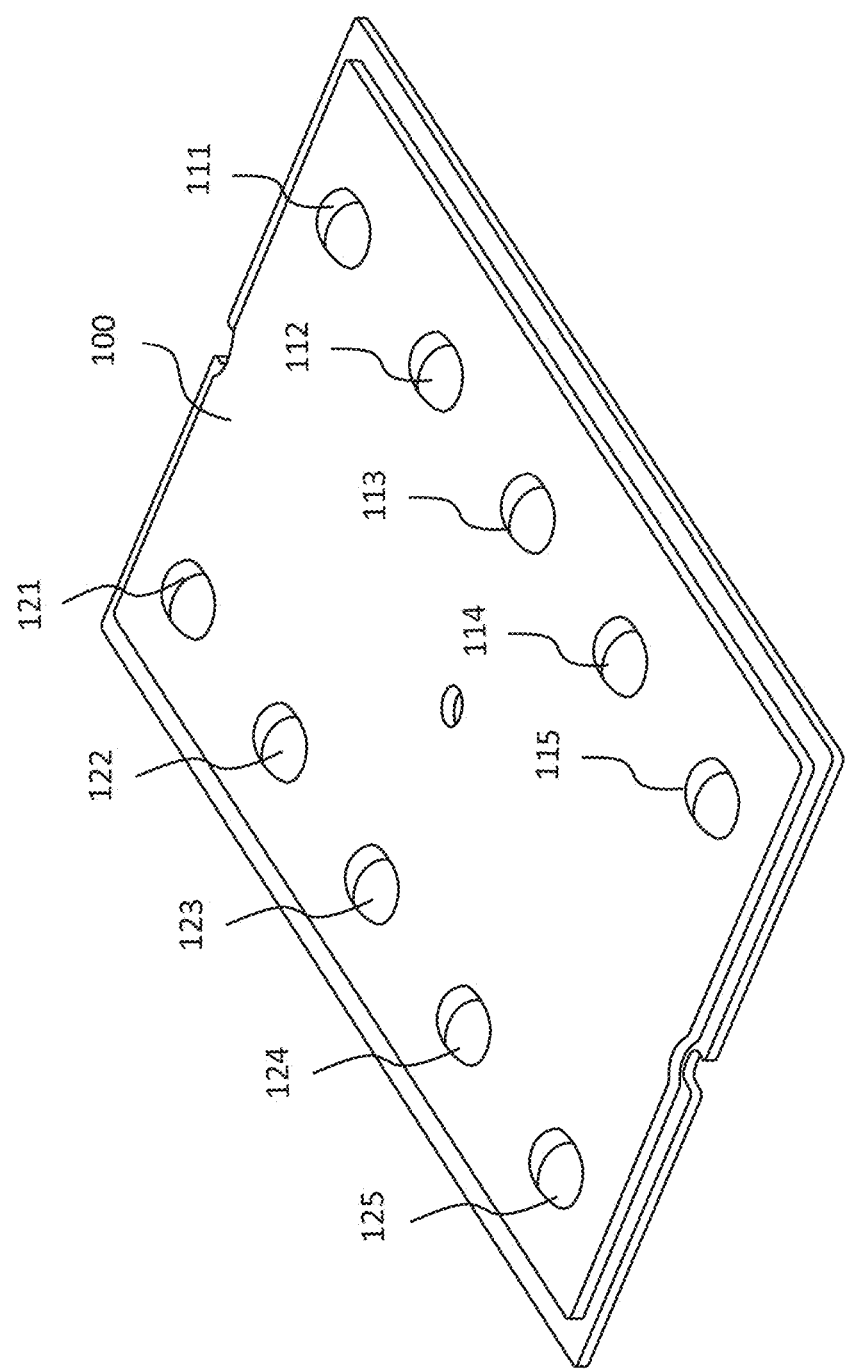
FIG. 5 is a perspective view of a lens or optic co-molded to a base, according to one embodiment.

In some embodiments, as shown in FIGS. 3, 4A and 5, the plurality of lenses 111-115 are disposed on the base 100 and spaced from each other in a row 110. Similarly, another plurality of lenses 121-125 are disposed in another row 120. In one embodiment, as shown in FIGS. 3 and 4A, the lenses 111-115 may be provided as individual components, as sheets containing multiple rows of lenses, as strips 110s containing a single row of lenses, and/or other forms. Providing the lenses in one or more sheets or strips 110s may facilitate coupling multiple lenses to a corresponding array of LEDs and/or to the base 100. For example, the lens strips 110s and 120s are coupled to a first surface 100f (e.g., a front, upper, or exposed surface in FIG. 4A) of the base 100. An inner surface of each lens 111-115 may define a cavity 140 (as shown in FIG. 4C) or other volume that may receive light from a respective one of the LEDs 150. The base 100 can include a plurality of apertures or openings (e.g., 131-135). The openings 131-135 can be accessed from an opposite second surface 100b of the base 100 (e.g., a back, lower, or rear surface in FIG. 4B) of the base 100. The array of LEDs can be disposed through the openings 131-135 from the second surface 100b. In such an embodiment, the printed circuit board ("PCB") supporting such an array of LEDs would typically be located under the base 100. Accordingly, an optical assembly or an illumination system can comprise a two-dimensional array of LEDs. The resulting two-dimensional array of LEDs can comprise a light module or light bar, one or more of which can be disposed in a luminaire or other lighting apparatus, for example.

In some example embodiments, the lenses (e.g., lenses 111-115 and lenses 121-125) can be formed of optical grade silicone and can be pliable and/or elastic. In some example embodiments, the lenses can be formed of an optical plastic such as poly-methyl-methacrylate (PMMA), polycarbonate, silicone, or an appropriate acrylic, to mention a few representative material options without limitation. The base 100 may be configured to absorb light and/or redirect light in a desired direction. For example, in some embodiments, the base 100 may be colored such that the base 100 has desired reflectance and/or absorption properties. For example, the base 100 may be a colored black, or any dark color that absorbs a high percentage of light (e.g., greater than 90%). In embodiments, the base 100 may include a host material and a colorant in the base material. The colorant may be a pigment, a dye, etc. that colors the host material, thereby adjusting its absorption/reflection properties. For example, in some embodiments, the material of the base 100 may be selected to absorb at least 90%, at least 91%, at least 92%, at least 93%, at least 94%, at least 95%, at least 96%, at least 97%, at least 98%, at least 99%, or more of light. Non-limiting examples of suitable host materials include PMMA, silicone, and/or other polymeric materials. In embodiments, the base 100 may include a host material having a first surface and a second surface opposite the first surface. The first surface may be an upward facing surface. A colored layer may be disposed on the first surface. The colored layer may be a layer of paint, dye, etc.

By providing the base 100 with a black or otherwise dark outer surface, any light incident on the first surface 100f can be absorbed and not reflected thereby preventing light leakage toward an undesired direction (e.g., the house side).

Referring to FIG. 5, the plurality of lenses 111-115 and 121-125 can be individually coupled to the base 100. In some embodiments, the plurality of lenses 111-115 and 121-125 can be glued or co-molded with the base 100. For example, the plurality of lenses 111-115 and 121-125 can be attached to the base 100 by an adhesive. In other embodiments, the lenses 111-115 may be snapped, fastened, and/or otherwise mechanically secured with the base 100.

As shown in FIGS. 4C and 5, the lenses 111-115 can have a dome-shaped outer surface 111o with a central axis perpendicular to a plane of the base 100. For example, the lenses 111 and 121 have central axes 111a and 121a, respectively, as shown in FIG. 4C. The central axis 111a or 121a can be an axis passing through a center of the lens 111 or 121. In some embodiments, the central axis of a lens lies within a plane (perpendicular to plane 311 in FIG. 8A) (1) that extends through the lens in a direction that is parallel to the house side to street side direction (i.e., the x direction in FIG. 8A) and/or extends perpendicular to the length of the reflector (i.e., they direction in FIG. 8A) and (2) that extends through the optical cavity 140. With reference to that plane (see FIG. 8C), the central axis of the lens extends along the height of the lens (i.e., along the z direction) and bisects the midpoint of the linear distance between the end points 901, 904 of the outer surface 111o (i.e., where the outer surface intersects the plane of the base 100).

Figure 8A:
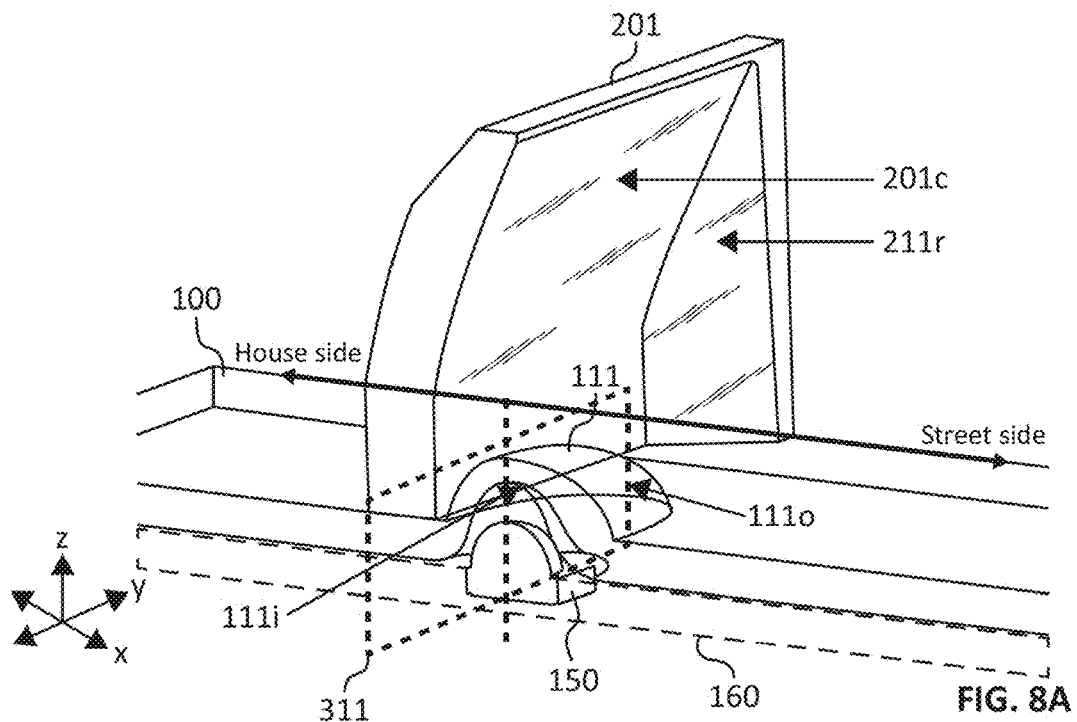
FIG. 8A is a perspective cross-section view of the reflector, lens and a light source arranged in an optical assembly, according to one embodiment.
Figure 8B:
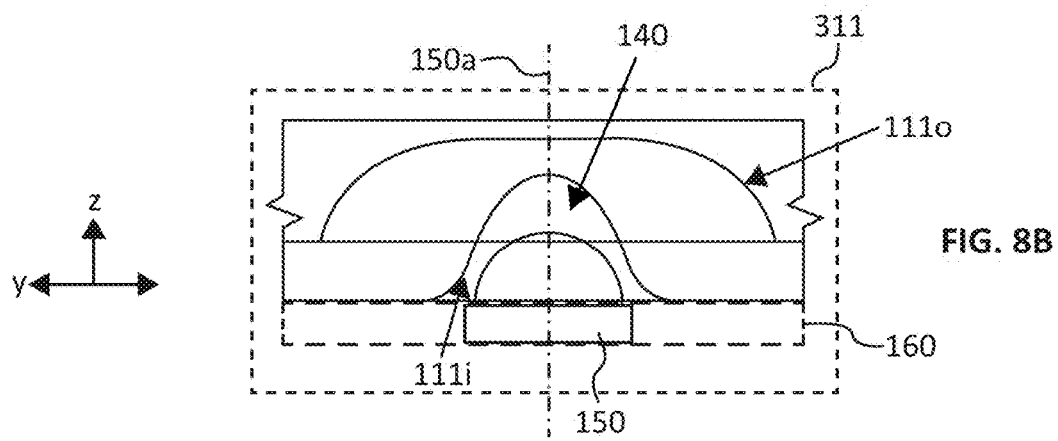
FIG. 8B is a cross-section view of the lens and the light source viewed from a side (e.g., house side) illustrating a symmetric configuration of the lens with respect to the light source, according to one embodiment.
Figure 8C:
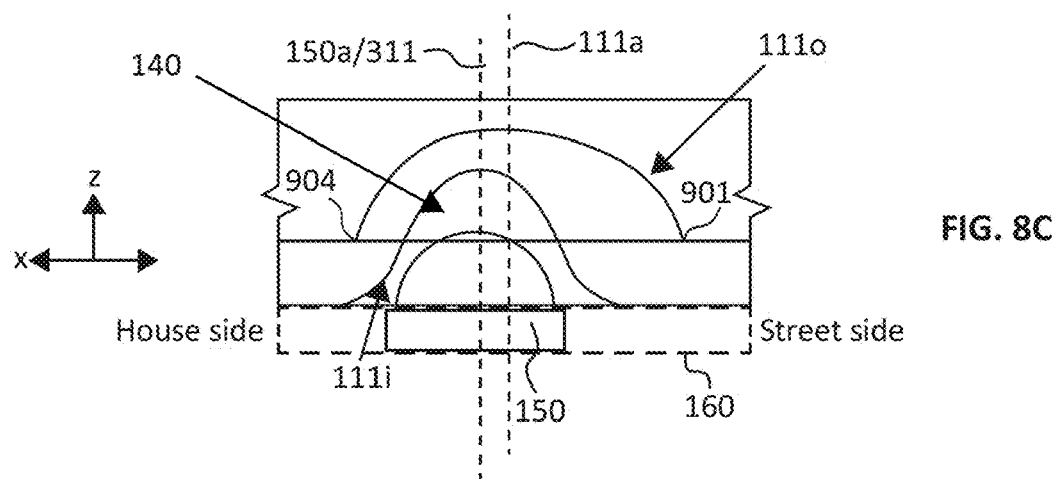
FIG. 8C is a cross-section view of the lens and the light source viewed from a front with a house side on the left and a street side on the right illustrating asymmetry of the lens with respect to the light source, according to one embodiment.
Figure 9A:
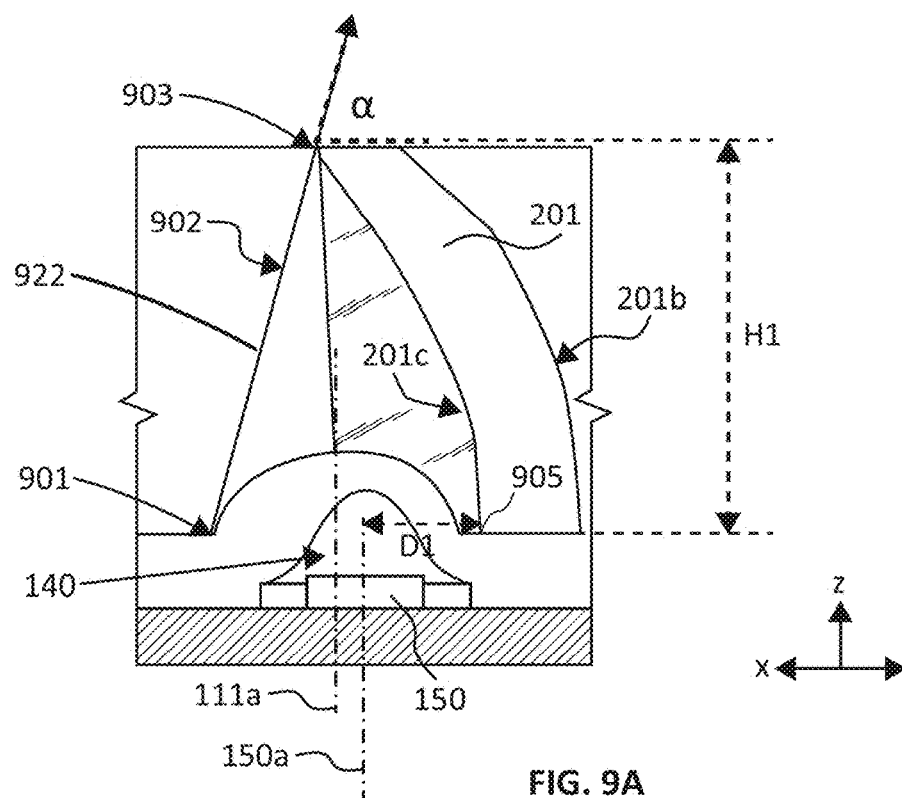
FIG. 9A illustrates a first angle associated with the reflector characterizing a curved surface, according to one embodiment.
Figure 9B:
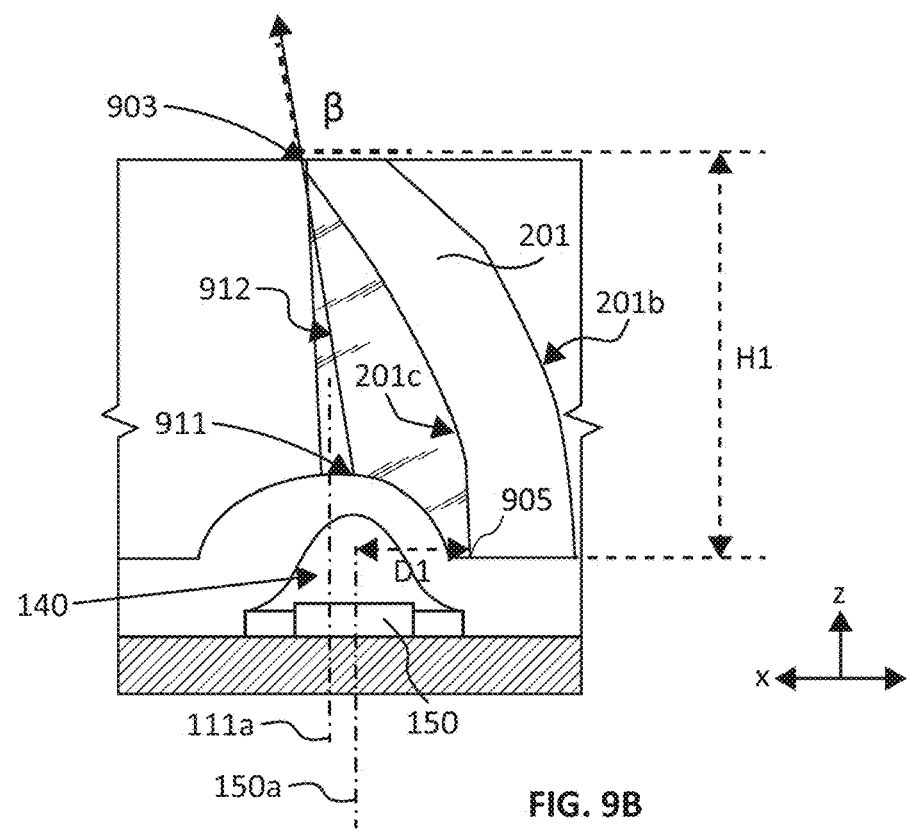
FIG. 9B illustrates a second angle associated with the reflector characterizing a curved surface, according to one embodiment.

In some embodiments, as shown in FIGS. 8C and 9A-9B, the LED 150 of the plurality of LEDs is disposed in a cavity 140 of lens 111 of the plurality of the lens 111-115 such that the central or optical axis 150a of the LED is offset from the central axis 111a of the lens 111 in a direction toward the reflector surface 201c of the reflector 201. In embodiments, the plurality of lenses 111-115 have a corresponding plurality of LEDs 150 disposed therein such that the central axes of the lenses are offset toward and/or close to the reflector 201.

Figure 6:
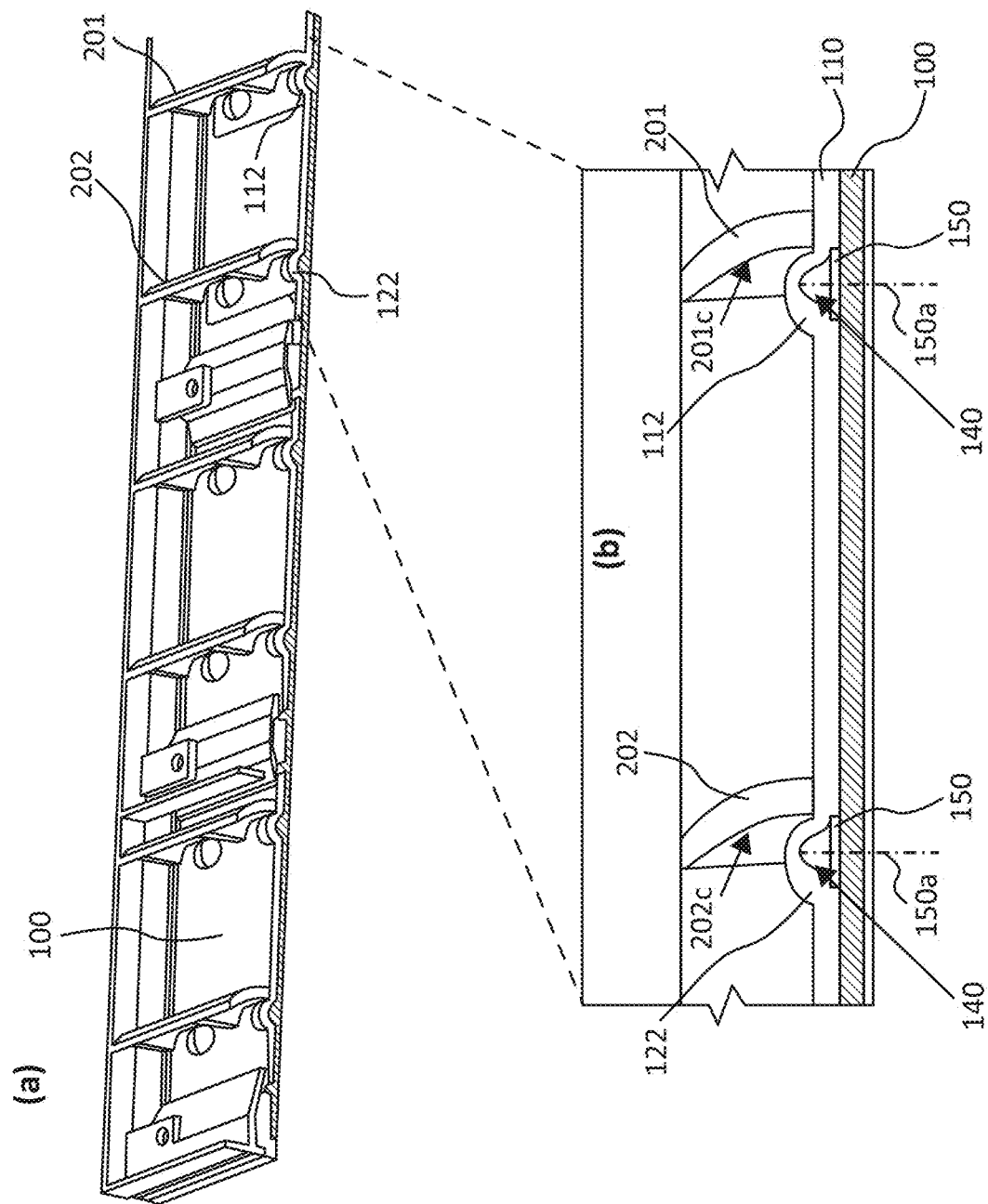
FIG. 6 illustrates a cross-section of an optical assembly, (a) showing a perspective view of an optical assembly and a cross-section, and (b) showing a front view of the cross-section illustrating a cross-section of reflectors, lenses, and light sources, according to one embodiment.

In some embodiment, as shown in FIGS. 4C and 6(*b*), each of the plurality of light emitting diodes (LED) 150 are placed in a corresponding lens of the plurality of lenses 111-115. The LED 150 has an optical axis 150a perpendicular to a plane of the LED or perpendicular to the base 100. In embodiments, as shown in FIGS. 4C and 8A-8C, the optical axis 150a of an LED 150 is offset from the central axis 111a of an outer surface of the lens 111 of the plurality of lenses 111-115. In embodiments, the optical axis 150a of the LED 150 and a central axis 111a of the outer surface 111o of the lens 111 are aligned or not offset from each other. In some embodiments, each LED 150 may be provided on a printed circuit board (PCB) 160 and/or other substrate. The PCB 160 can be attached to the second surface 100b of the base 100 such that the LEDs reside within and/or emits light into the cavities 140 of the lenses. In some embodiments, the PCB 160 and/or other substrate may be configured to absorb at least 90% of light incident thereon, such as by including a light-absorbing material (e.g., a material containing a pigment that absorbs at least 90%, at least 91%, at least 92%, at least 93%, at least 94%, at least 95%, at least 96%, at least 97%, at least 98%, at least 99%, or more of light).

Figure 7A:
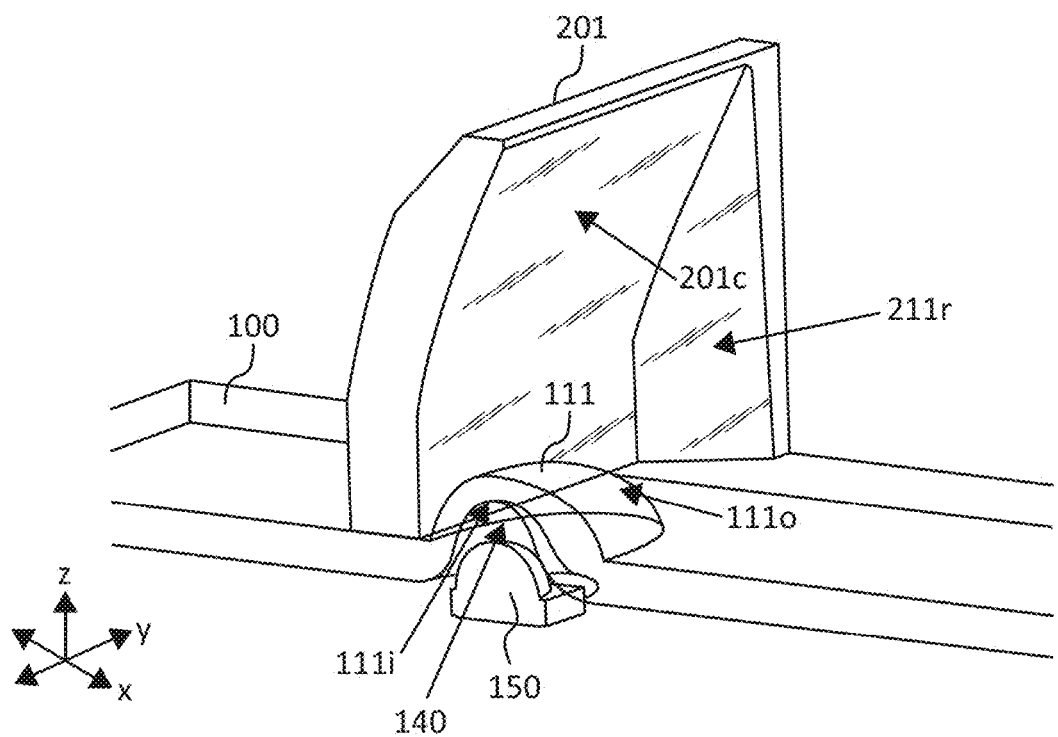
FIG. 7A is a perspective cross-section view of the reflector, lens and a light source arranged in an optical assembly, according to one embodiment.
Figure 7B:
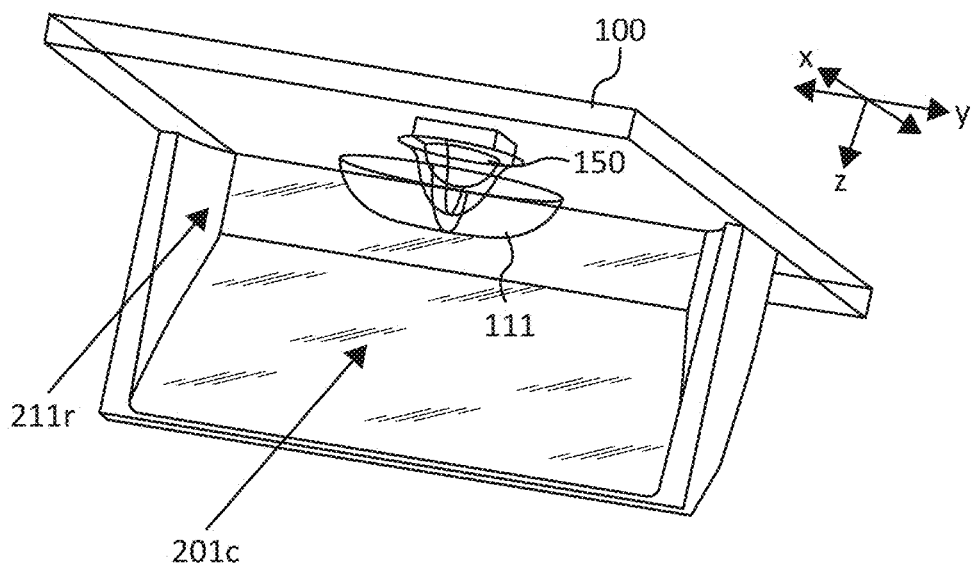
FIG. 7B is a perspective view of an optical assembly with a central axis of the light source pointing downward and reflector directing the light from the light source toward the front, according to one embodiment.

FIGS. 7A and 8A illustrate a cross-section view showing structure of an exemplary lens 111, according to one embodiment. As shown, the lens 111 has a dome shape with an inner surface 111i facing the LED 150 and an outer surface 111o facing away from the LED 150, opposite the inner surface 111i. The inner surface 111i can include a refractive surface that receives light headed away from the optical axis of the LED 150, for example away from the street to be lighted. The inner surface 111i can be a concave lens surface facing toward the LED 150, with the inner surface 111i being spaced apart from an outer surface of the LED 150. The inner surface 111*i* can receive the incident light from the LED 150 and create a refracted beam that exits the lens 111 through the outer surface 111*o*, which causes the beam to diverge. The outer surface 111*o* can be a convex lens surface, for example. In some embodiments, the inner surface 111*i* may have a shape that differs from a shape of the outer surface 111*o*. For example, the inner surface 111*i* may have a concave shape that is different from the convex shape of the outer surface 111*o*. In embodiments, the concave shape of the inner surface 111*i* is offset from the outer surface 111*o*.

As noted above, each lens 111-115 can comprise a cavity 140 (see FIGS. 4C and 7A) that has a concave shape. The walls of the lens may be asymmetric in some embodiments. For example, a rear wall (e.g., closest to the reflector 201) may be thinner than a front wall (e.g., further from the reflector 201), which may enable the LED 150 to be positioned closer to the reflector 201 to provide a sharper light cut off angle. The cavity 140 can be filled with air between the inner surface 111*i* and the LED 150. The cavity 140 receives light from the LED 150. In some embodiments, the lens 111 comprises a receptacle in which the LED 150 can be seated or is otherwise disposed. The receptacle can be irregularly shaped to receive a circuit board to which one or more light emitting diodes is mounted, for example.

Referring to FIGS. 8A-8B, a lens (e.g., lens 111) is symmetric in a reference plane 311 extending through the optical axis 150*a* of the LED 150 along they direction (in FIG. 8A) and when viewed in the x direction (in FIG. 8A). Additionally, referring to FIGS. 8A and 8C, the lens is asymmetric about the reference plane 311 when viewed in they direction (in FIG. 8A) in that the central axis 111*a* of the lens is offset from the reference plane 311. As shown in FIG. 8C, the reference plane 311 separates the lens into a street-side portion and a house-side portion. The street-side portion is larger in size than the house-side portion in order to reduce the size of the optical system while providing better cut-off. The street-side portion controls a main beam emitted from the LED 150 and directs the beam toward a desired direction (e.g., between 55°-75° relative to nadir). The house-side portion acts as the light transmission layer which sends the light to the reflector 201. Such lens construction advantageously sends more light towards a desired direction through the lens. For example, a reduced size of a lens portion (e.g., the house-side lens portion) provides better light beam cutoff by the reflector as well as enables lowering a height of the reflector 201 thereby making an optical assembly compact. For example, by offsetting the cavity 140 and/or LED 150 from the central axis 111*a* of the lens 111 in a direction toward the reflector 201 (i.e., the optical axis 150*a* of the LED 150 is closer to the reflector base than the central axis 111*a* of the lens 111), the optical axis 150*a* of the LED 150 may be positioned closer to the reflector 201, which may enable a height of the reflector 201 to be reduced while still providing a desired cutoff angle for light.

Referring to FIGS. 3, 6, 7, 8A, 9A and 9B, each reflector 201 may protrude from the base 100 at a first end 905 (proximate the base) and terminate at a second end 903 and may have a reflective surface 201*c* that extends between the first end 905 and the second end 903 (see FIGS. 9A, 9B). For example, each reflector 201 may include a first side that includes the reflective surface 201*c* (e.g., street side) and an opposite second side 201*b* (e.g., a house-side or a side behind the reflective surface 201*c*). In one embodiment, the reflector 201 is an elongated member having a reflective material or coating on the reflective surface 201*c*, while the second side may be painted black (or other dark color) to prevent light from a different row of LEDs from reflecting toward the house side. Each reflector 201 is disposed adjacent to the plurality of lenses 111-115 having corresponding plurality of LEDs 150 therein such that the plurality of LEDs 150 or lenses 111-115 are at the first side (e.g., street side). As illustrated, the reflective surface 201*c* extends in a direction perpendicular to the plane of the base 100, however in other embodiments the reflective surface 201*c* may extend from the base 100 at other angles. The reflective surface 201*c* curves over the plurality of LEDs 150 located in the corresponding plurality of lenses 111-115. The reflective surface 201*c* (i.e., the second end 903) further extends beyond the optical axis 150*a* of the LED 150. Accordingly, the reflective surface 201*c* is configured to direct light emitted by the plurality of LEDs 150 toward the first side (e.g., the street side) and prevent the light from leaking toward the second side (e.g., the house side) of the reflector 201.

Referring to FIG. 3, the optical assembly 10 can include a plurality of reflectors 201, 202, 203 and 204 and corresponding rows of lenses and LEDs. In one embodiment, each reflector 201-204 has the same construction and is positioned in a similar manner with respect to the corresponding plurality of LEDs. For example, the reflector 202 is positioned adjacent to the second plurality of lenses 121-125 covering a corresponding plurality of LEDs 150 such that the reflective surface 202*c* extends over and beyond a central axis of the LEDs 150. While shown with a single reflector extending along a length of each row of LEDs 150, it will be appreciated that in some embodiments multiple reflectors may be provided for each row of LEDs 150. For example, each LED 150 and lens pair (or a number of pairs within each row) may include a dedicated reflector.

In FIG. 3, the plurality of lenses, the plurality of LEDs, and reflectors are disposed in a number of rows. For example, as shown in FIG. 3, the first plurality of lenses 111-115 are arranged in a first row and a first plurality of LEDs (e.g., see 111 in FIG. 4C) disposed in corresponding lens of the first plurality of lenses 111-115. The first reflector 201 is disposed adjacent to the first plurality of lenses 111-115 such that the reflective surface 201*c* of the first reflector 201 extends over the first plurality of lenses 111-115.

The second plurality of lenses 121-125 are arranged in a second row spaced from the first row and a second plurality of LEDs (e.g., see LED 150 in lens 121 in FIG. 4C) disposed in the corresponding second plurality of lenses 121-125. The second reflector 202 is disposed between the first plurality of lenses 111-115 and the second plurality of lenses 121-125 such that a reflective surface 202*c* of the second reflector 202 extends over the second plurality of lenses 121-125. In other words, with respect to the reflector 202, the second plurality of LEDs in the lenses 121-125 are located at the first side of reflector 202 (e.g., street side), and the first plurality of lenses 111-115 are located at the second side of reflector 202 (e.g., house side). In some embodiments, the second side of the reflectors 201-204 can be coated or formed from a black (or other dark color) material to absorb light emitted by LEDs on the second side or partially reflective to reflect light emitted by LEDs on the second side without interfering with the light emitted by LEDs on the first side.

While illustrated with the LEDs 150 and lenses 111-115, 121-125 arranged in two parallel rows, it will be appreciated that other arrangements are possible in embodiments. For example, the LEDs and lenses may be arranged in any number of rows, columns, and/or other patterns. The LEDs and lenses may be arranged at regular and/or irregular intervals in one or more directions. Additionally, a total number of LEDs and lenses and/or a number of LEDs and lenses in a given row, column, or other array may vary across embodiments to meet the needs of a particular lighting application.

In some embodiments, as shown in FIG. 3, the reflector 201 (and 202-204) can include side reflectors between each lens to redirect and reflect the light traveling in a direction that is aligned with or substantially aligned with a length of reflector 201 in a desired direction (e.g., street side) thereby improving the illumination profile at the street side. The side reflectors may also prevent light interference between adjacent LEDs thereby improving efficiency of light utilization. For example, the reflector 201 includes side reflectors 211, 212, 213 and 214 projecting from the reflective surface 201c toward the first side (e.g., street side). In some embodiments, the side reflectors 211-214 may be curved or transition from the surface of the reflector 201. In some embodiments, the side reflectors 211-214 may be angled (e.g., up to 5°) with respect to a perpendicular to the base 100. The side reflector 211 has a reflecting surface 211r facing the LED in the lens 111. The side reflector 212 located between the lenses 111 and 112 has two reflecting surfaces 212r, one surface 212r faces the lens 111 and another surface 212r faces the lens 112. Similarly, each of the side reflectors 213 and 214 has reflecting surfaces 213r and 214r facing the lenses between which each is interposed.

Accordingly, the optical assembly 10 can be configured to direct light from each row of LEDs via a corresponding reflector toward the street without light interference between LEDs or light interference between adjacent rows of LEDs. Thus, light emitted from each LED or rows of LEDs can be better directed to a desired direction (e.g., street side) to improve light utilization, while cutting off or otherwise preventing light emitted by the optical assembly 10 from being directed toward undesired directions (e.g., house side).

In some embodiments, as shown in FIGS. 7A, 8A and 9A-9B, the reflective surface 201c of the reflector 201 can have a partially concave shape. However, the present disclosure is not limited to a concave shape. In some embodiments, different linear and/or curved surfaces can be created to direct light in a desired direction. For example, the reflective surface 201c of the reflector 201 can have a parabolic shape extending from the base 100 toward and beyond the central axis of the plurality of LEDs. As another example, the reflective surface 201c of the reflector 201 can have a free form shape characterized by multiple curvatures between end points of the reflective surface 201c, with a first end point being at the junction of the reflective surface 201c and the base 100 and a second end point being a distal end of the reflective surface 201c that extends over the plurality of lenses 111-115. For example, the free form shape comprises a first curvature between the first end point at the base 100 and an intermediate point between the first end point and the second end point; and a second curvature between the intermediate point and the second end point of the curved surface. The free form may be generally characterized by the curved portion elongating in a direction of the selected area (e.g., a street-side direction).

In some embodiments, the reflector 201 has a reflective surface 201c with a linear segment or base extending approximately perpendicularly from the base 100 up to a height corresponding to a top of the outer surface 111o of the lens 111. Extending from the linear segment, the reflective surface 201c can extend further with a curve toward the central axis of the LED. For example, the curve can be characterized by a plurality of points connected by curved line segments. The series of curved segments each comprise a reflective surface and a curvature having a profile of an arc segment of an ellipse, a parabolic curvature, a hyperbolic curve, or other second or higher degree curve portions.

Referring to FIGS. 9A and 9B, the reflective surface 201c of the reflector 201 can be characterized by a first angle α, a second angle β, or both. The first angle α is formed between the base 100 and a line 902 that extends between a distal end 901 (e.g., street side) of the lens 111 furthest from the reflective surface 201c and a distal end 903 of the reflective surface 201c located over the lens 111. The second angle β is formed between the base 100 and a line 912 that extends from a position 911 on the outer surface 111o of the lens 111 that is aligned with the optical axis 150a of the LED 150 and the distal end 903 of the reflective surface 201c located over the lens 111.

In some embodiments, the first angle α can be in a range between 60° and 90° (e.g., between 60°-70°, 70°-80°, 80°-90° or other narrow ranges). In some embodiments, greater angles may further enable the height of the reflector to be decreased and/or may provide sharper backlight cutoff.

In some embodiments, the second angle β can be in a range between 70° and 130°. In some embodiments, the reflector 201 that satisfies the first angle α, the second angle β, or both facilitates a compact design, while providing a desired cutoff of the backlight (e.g., light directed toward the house side). For example, the reflective surface 201c of the reflector that satisfies the first angle and the second angle conditions facilitates reducing a height of the reflector 201 required to cut toff the backlight and also allows positioning of the LEDs 150 proximate to the reflective surface 201c so that the light from the LEDs can be directed in a desired direction (e.g., street side). In other words, the first angle α and the second angle β bring the distal end 903 of the reflective surface 201c closer to the LEDs while facilitating cutoff of the backlight (e.g., light directed toward the house side).

Figure 9C:
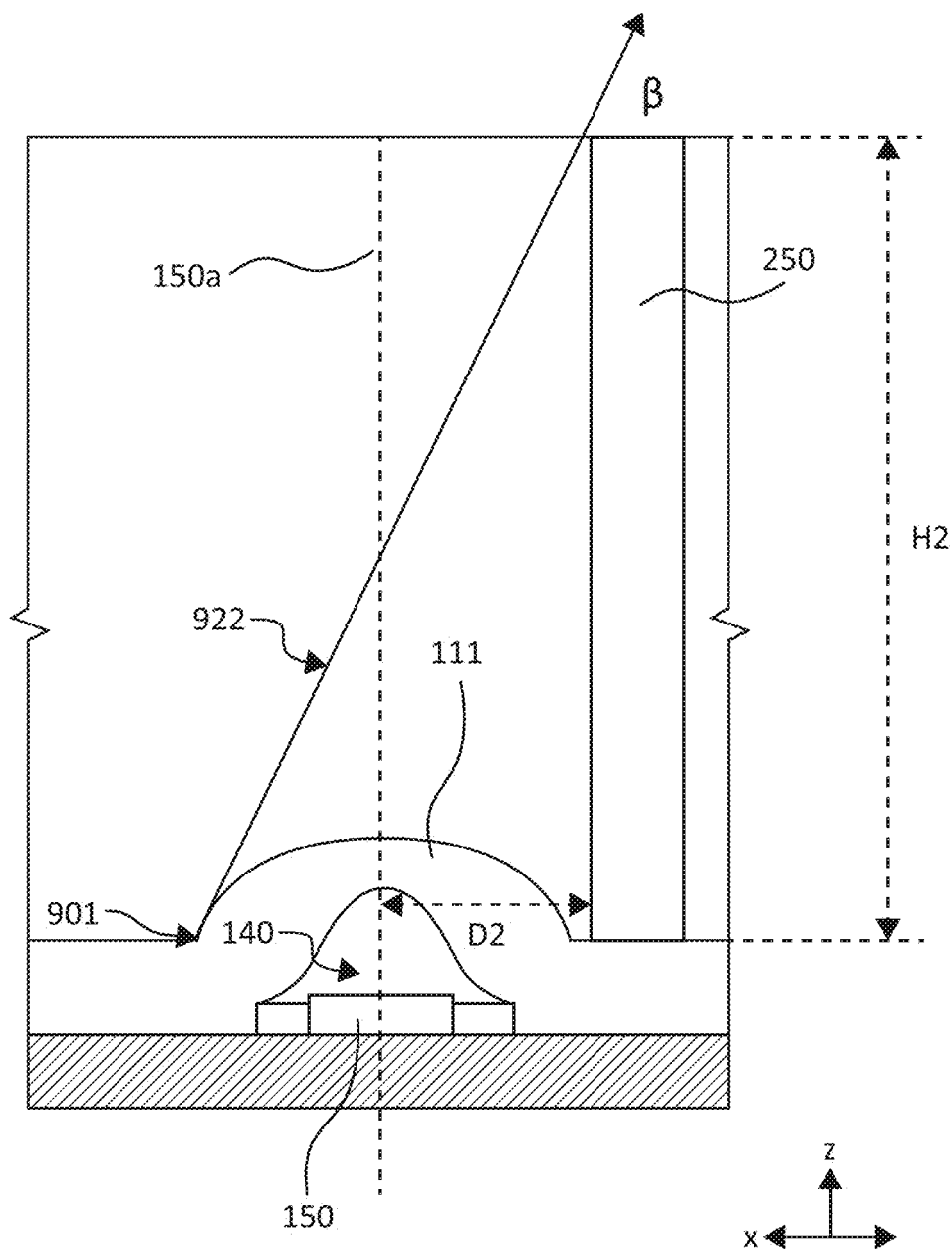
FIG. 9C illustrates a traditional reflector with straight surface, according to one embodiment.

In some embodiments, referring to FIGS. 9A-9C, the reflective surface 201c of the reflector 201 facilitates compact design compared to a straight edge reflector 250 (see FIG. 9C). For example, the reflective surface 201c extends over the optical axis 150a of the LED 150 which allows the beam emitting from the LED and transmitted by the lens 111 to be cutoff close to the lens 111 before the beam can spread. The height of the reflective surface 201c can be H1. On the other hand, if the straight edge reflector 250 is used, a height H2 of the straight edge reflector 250 from the base 100 is needed to intercept a beam 922 transmitted at the distal end 901 of the lens 111. Comparing FIGS. 9A and 9C shows that the beam 922 in FIG. 9A is intercepted at the reflective surface 201c within a short distance. On the other hand, the beam 922 in FIG. 9C needs to travels much further before being intercepted by the straight edge reflector 250. Thus, the height H1 of the reflector 201 can be substantially smaller than the height H2 of the straight edge reflector 250 while still providing the desired backlight cutoff ability. For example, the H1/H2 ratio may be between ⅓ to ½. As such, using reflector 201 a more compact illumination system (e.g., a luminaire) can be designed.

Figure 10:
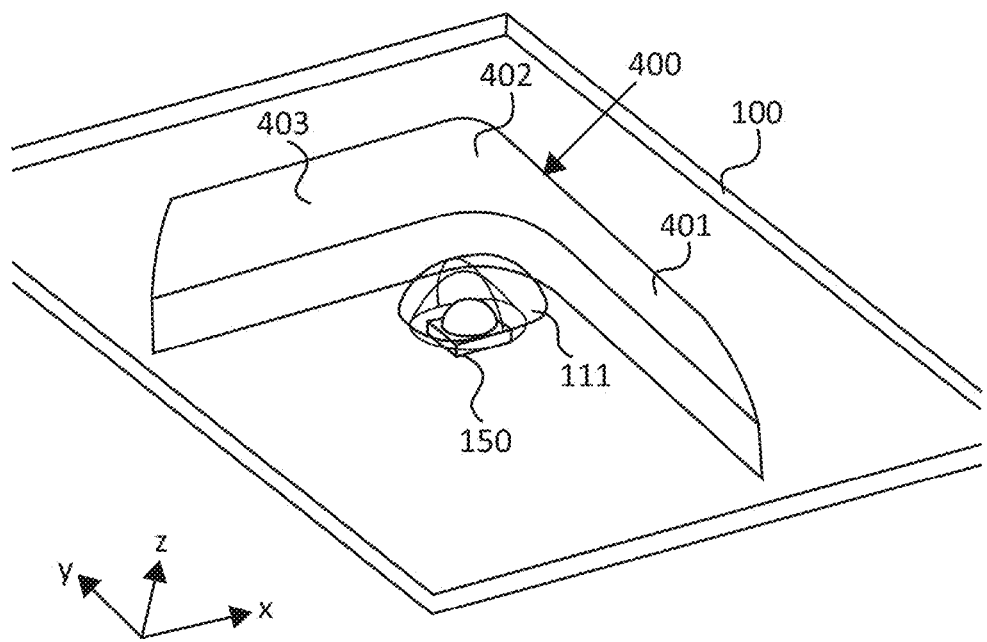
FIG. 10 is a perspective view of a corner reflector assembled on a base with a light source disposed in the lens, according to one embodiment.
Figure 11:
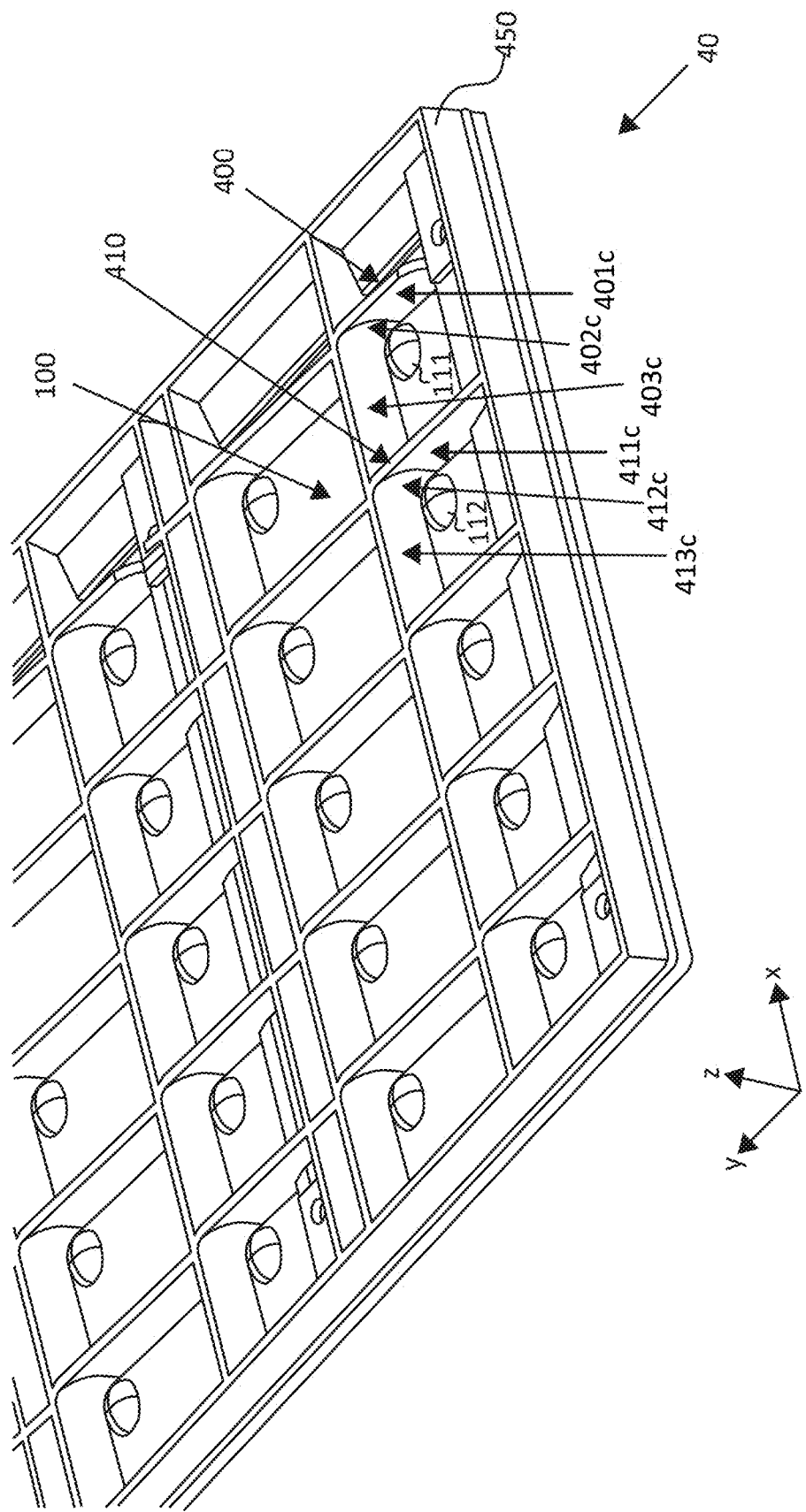
FIG. 11 is a perspective view of an optical assembly with a plurality of corner reflectors assembled on a base with a plurality of light sources disposed in corresponding lenses, according to one embodiment.

In some embodiments, a reflector can have an angular shape to light a corner space. In some embodiments, as shown in FIGS. 10 and 11, a reflector 400 can be angular in shape comprising a first surface portion 401, a second surface portion 403 disposed at an angle with the first surface portion 401, and a corner surface portion 402 connecting the first surface portion 401 and the second surface portion 401. The first surface portion 401 and the second surface portion 403 have surfaces 401c and 403c, respectively. The surfaces 401c and 403c can have similar structure as the reflective surface 201c of the reflector 201 discussed herein. The corner surface portion 402 also has a surface 402c to direct the light emitted towards a corner back to a desired direction (e.g., street side). In one embodiment, the surface portion 402 curves along multiple axes to connect the first surface portion 401 and the second surface portion 403. Likewise, the surface 402c of the surface portion 402 also curves along multiple axes (e.g., x and y axis in the plane defined by the base 100) connecting the surfaces 401c and 403c and also further curves along another axis (e.g., z axis perpendicular to the base 100) and extends over the lens to at least partially cover the lens.

FIG. 11 illustrates an exemplary corner optical assembly 40 comprising a plurality of corner reflectors such as reflectors 400 and 410. At the corners of each reflector 400 and 410, an LED 150 is located in each of the lenses 111 and 112, respectively. The surfaces 401c, 402c and 403c of the reflector 400 face the LED 150 in the lens 111. Similarly, the surfaces 411c, 412c and 413c of the reflector 410 face the LED 150 in the lens 112. The optical assembly 40 includes additional similar corner reflectors, and lenses, although not numbered. As discussed herein, the reflectors 400 and 410, and lenses 111 and 112 of the optical assembly 40 can be installed on the base 100. The base 100 along with the reflectors, lens, and LEDs can be further supported by a frame 450. The frame 450 can provide a support structure for the base and reflectors. The frame 450 can be further adapted to be installed in a casing of a luminaire.

Figure 12:
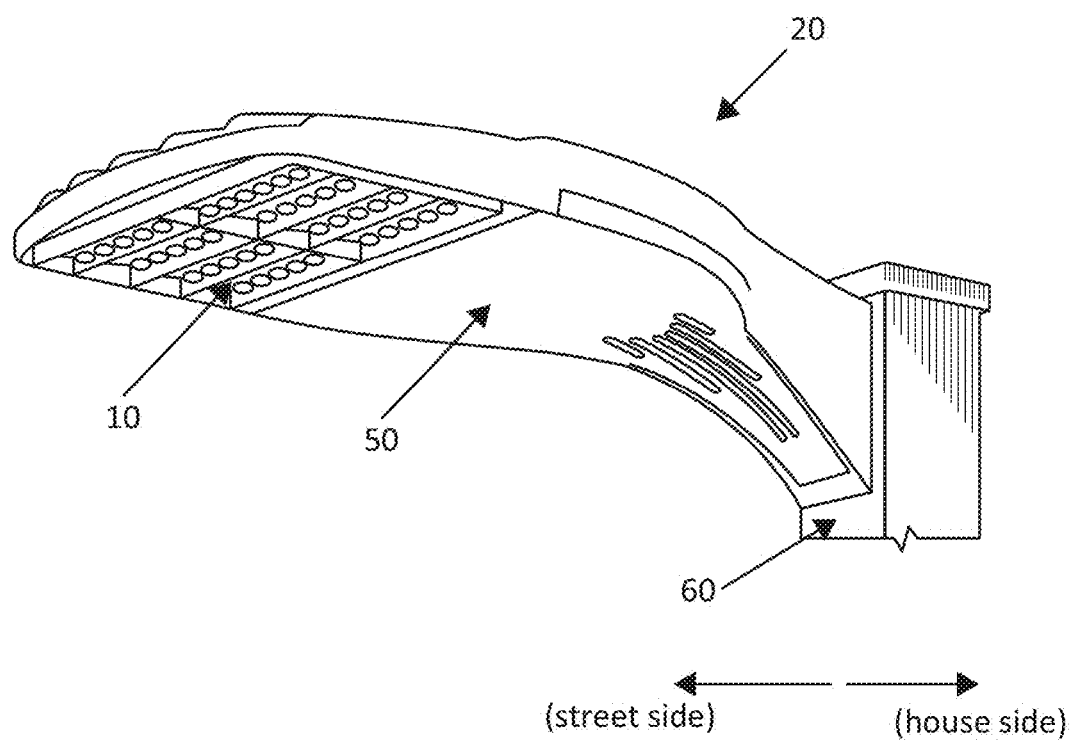
FIG. 12 is a luminaire employing an optical assembly according to an embodiment disclosed herein.

FIG. 12 illustrates an example luminaire 20 implementing an optical assembly 10. The optical assembly 10 can be installed in a casing 50 coupled to a pole 60. The pole 60 can be installed at the housing side and the casing 50 can extend toward the street or a corner desired to be illuminated. While not illustrated, the optical assembly 40 may be incorporated into a luminaire, e.g., by replacing the optical assembly 10 of the luminaire 20 with the optical assembly 40.

The optical assemblies discussed herein can be configured for various applications. For example, the optical assembly can be used to illuminate a selected area (e.g., a street) while cutting off and/or otherwise preventing leakage of the light away from the selected area (e.g., towards a house). For this purpose, the reflector can be curved as discussed herein. The optical assembly can be oriented downwardly towards ground such that the optical axes 150a of the LEDs 150 are oriented in a general downward direction (e.g., see FIGS. 2 and 7B), and the curved surface of the reflector directs the light toward a selected area (e.g., the street, a pathway, or other indoor or outdoor areas). The reflector can be configured as a corner reflector (e.g., see FIGS. 10-11) to direct light to a particular corner. In some embodiments, the optical assembly can include a combination of curved reflectors (e.g., reflector 201) and corner reflectors (e.g., 400). In some embodiments, the optical axis 150a of the LEDs 150 can be oriented upward and reflectors can be positioned to direct light to a particular wall, porch, or an object of interest for decorative purposes. It can be understood that the present application uses a selected area as a street to illustrate the concepts. However, the present disclosure is not limited to a particular application and the optical assembly may be configured to direct light to any selected area or region that is indoor (e.g., a wall inside a house) or outdoor (e.g., a street, a walkway, a porch, etc.).

Figure 13:
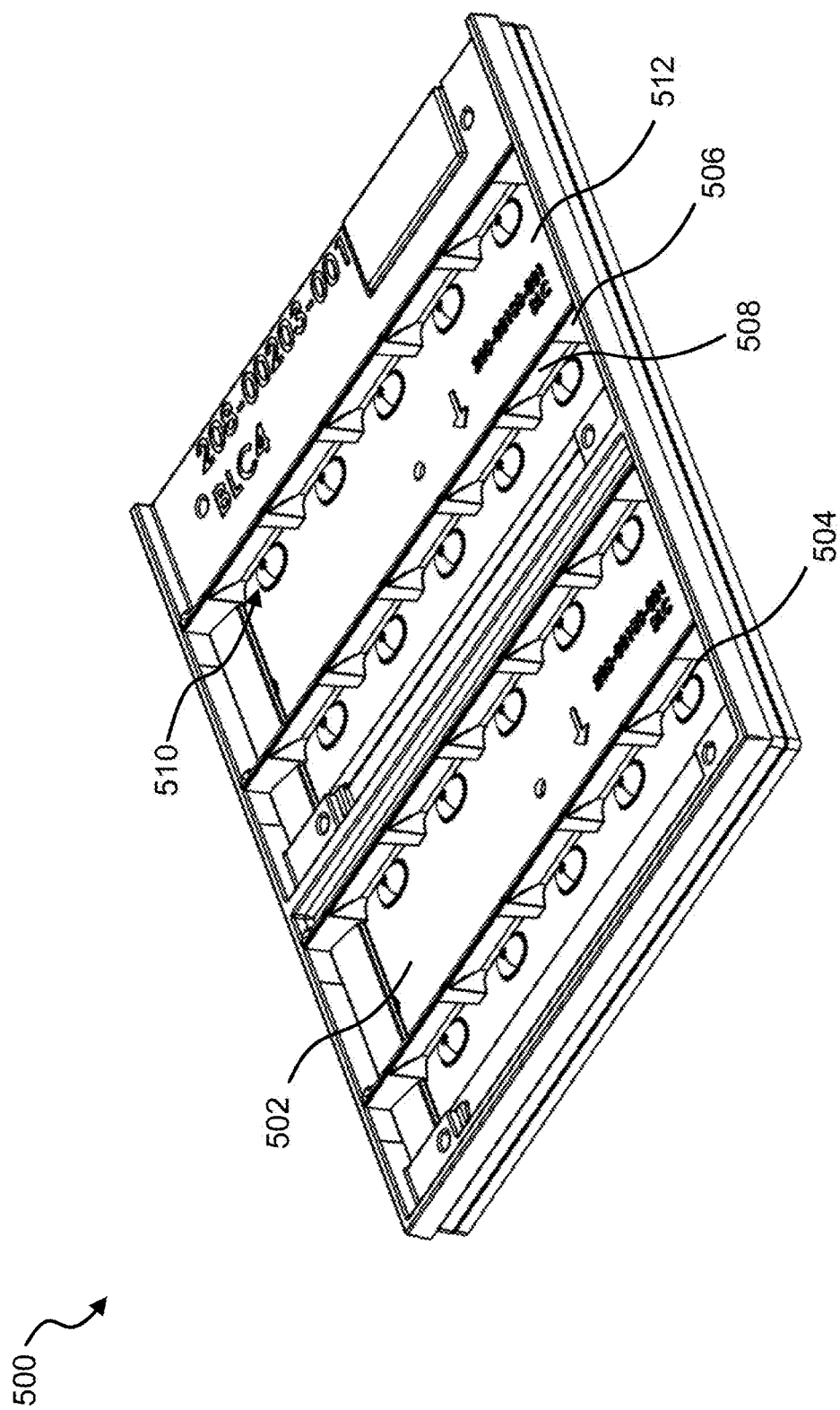
FIG. 13 is a perspective view of an optical assembly, according to another embodiment.

FIG. 13 illustrates an optical assembly 500, according to another embodiment. The optical assembly 500 may be similar to optical assembly 10 and may include any of the features described in relation to optical assembly 10. Optical assembly 500 may include a base 502, a plurality of lenses 504 disposed on or coupled with the base 502 so as to extend from and/or above the exposed surface of the base, a plurality of light sources (not shown) disposed in or behind the plurality of lenses 504, and one or more reflectors 506 that each have a reflective surface 508 (which may be similar to the reflective surface 201) disposed adjacent to one or more of the plurality of light sources and/or the plurality of lenses 504. In some embodiments, the lenses 504 and/or light sources may be arranged in one or more rows that are spaced apart from one another. Each row of lenses 504 and/or light sources may include one or more of the reflectors 506, with the reflective surface 508 of each reflector 506 extending from the base 502 and extending over at least a portion of one or more of the lenses 504 and/or light sources such as described previously with respect to reflectors 201.

Figure 14:
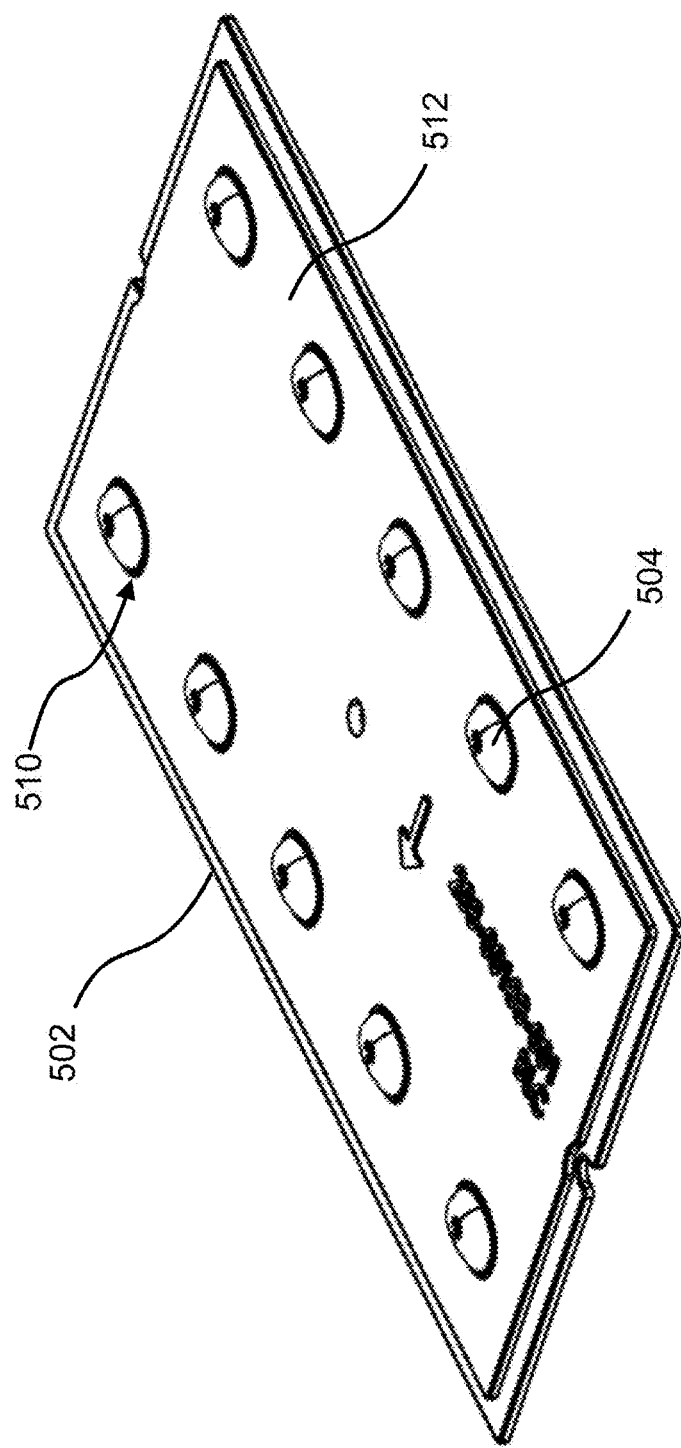
FIG. 14 is a top perspective view of a base and lens assembly of the optical assembly of FIG. 13.
Figure 15:
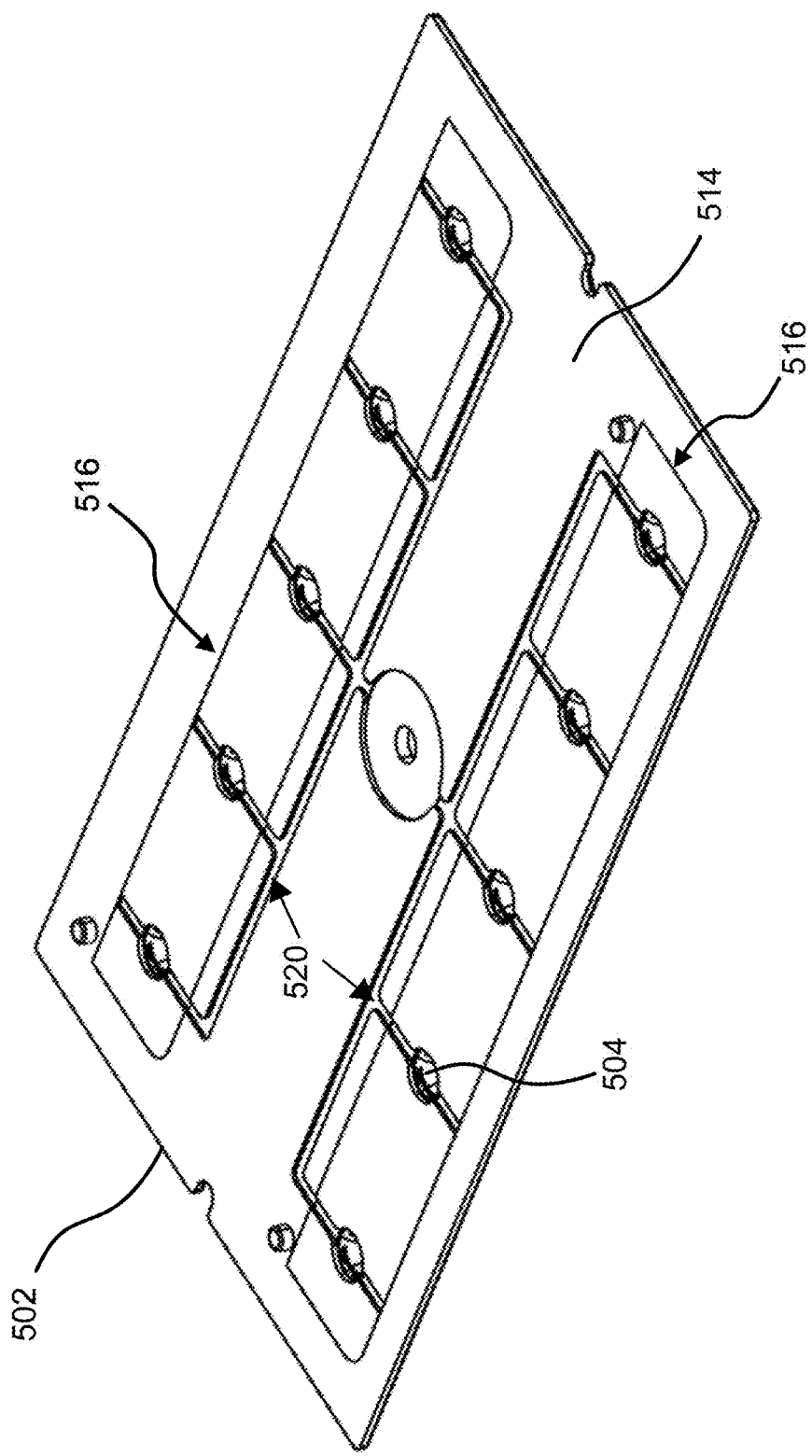
FIG. 15 is a bottom perspective view of the base and lens assembly of FIG. 14.

FIGS. 14 and 15 illustrate top and bottom perspective views of the base 502 and lenses 504. As illustrated, the base 502 may be configured to prevent the light from the LEDs from traveling in other directions than the desired direction. For example, in some embodiments, the base 502 may be configured to absorb at least 90%, or greater of light incident thereon. In some embodiments, the base 502 may be formed from and/or coated with a light-absorbing material, such as a material that contains a dark pigment that absorbs substantially all light (e.g., absorbs at least 90). This may enable the base 502 to absorb light directed toward the base 502 to prevent and/or reduce the amount of light reflected by the base 502, some of which may otherwise be reflected in an undesired direction.

The base 502 may define a number of apertures 510, with each of the apertures 510 receiving a respective one of the lenses 504 and/or light sources. For example, each lens 504 may include a dome that extends from a backside of the base 502 and extends at least partially through a respective one of the apertures 510. As described in relation to lenses 111-115, the dome may be asymmetric along at least one axis that is parallel to the base 502. For example, in some embodiments, each lens 504 may have an elliptical shape having a major axis and a minor axis that extend in a direction parallel to the base 502. The dome of each lens 504 may protrude away from the base 502 and may be asymmetric along the major axis (or other axis that extends through the lens 504 and the corresponding reflector 506). For example, a slope of the dome may be greater on a reflector-side of the dome than on an opposite surface along the major axis. The light sources may be disposed closer to the reflector-side of the dome in some embodiments, which may enable the corresponding reflector 506 to be positioned closer to the light source to provide a sharper light cut off angle.

In such embodiments, the light sources may include a number of LEDs that are provided on a printed circuit board and/or other substrate. The lenses 504 may be inserted through the apertures 510 of the base 502 from a rear side of the base 502 such that the lenses 504 are sandwiched between the printed circuit board and the base 502. By positioning the lenses 504 within apertures 510 formed within the base 502, a surface area of the base 502 that is exposed on the optical assembly 500 may be increased. When the base 502 is configured to absorb substantially all light incident thereon, the increased surface area may enable greater levels of light directed toward the base 502 to be absorbed, and may thereby help prevent light from being directed in an undesired direction. Such embodiments may enable the optical assembly 500 to direct at least or about 95%, at least or about 96%, at least or about 97%, at least or about 98%, at least or about 99%, at least or about 99.5%, at least or about 99.7%, or more of the light in a desired direction (e.g., a street side), with less than about 5%, less than about 4%, less than about 3%, less than about 2%, less than about 1%, less than about 0.5%, less than 0.3%, or less of the light being directed toward an undesired (e.g., opposite) direction (e.g., a house side). A cut off plane of the light (i.e., a reference plane that separates the desired direction from the undesired direction) may be in vertical alignment with a rearmost (e.g., closest to the undesired direction) light source and/or reflector of the optical assembly. In other words, the light cutoff plane (1) may extend through the optical axis of one or more of the plurality of LEDs located within the optical assembly at a location most distal from the desired direction and (2) may extend parallel to the optical axis of those one or more LEDs and perpendicular to the desired direction.

In some embodiments, the base 502 may include a front surface 512 and a rear surface 514 that is opposite the front surface 512. The reflectors 506 may be disposed on the front surface 512. The rear surface 514 may define one or more recesses 516 that may receive the lenses 504. For example, the lenses 504 may be provided as one or more strips and/or sheets of optical material that may each include one or more rows of lenses 504. The strips of material may be inserted within the recesses 516 to seat the lenses 504 within the apertures 510 defined within the base 502. In some embodiments, a thickness of the strips of material may be substantially the same as a depth of the recesses 516 such that a rear surface of each strip of material is substantially flush with the rear surface 514 of the base 502. In the illustrated embodiment, the base 502 defines two recesses 516 that are parallel to one another. A strip of material containing a first row of lenses 504 is inserted within a first of the recesses 516 and a second strip of material containing a second row of lenses 504 is inserted within a second of the recesses 516. It will be appreciated that other arrangements are possible in various embodiments. For example, each lens 504 may be a separate component, each sheet and/or strip of material may include multiple rows of lenses 504, the lenses 504 may be arranged in non-row arrays, and/or other variations are possible. Additionally, some embodiments may include multiple bases positioned side-by-side with one another.

In some embodiments, the rear surface 514 of the base 502 may include one or more adhesive channels 520 for receiving adhesive to attach the lenses and/or PCB (e.g., 160 in FIG. 4C) to the rear surface 514 of the base 502. The adhesive channels 520 can contain the adhesive within the channels so that the adhesive cannot enter apertures/openings (e.g., openings 131-135 in FIG. 4B) in the base 502 so as to detrimentally impact operation of the lenses 504 and/or LEDs. The adhesive channels 520 can extend along any length of the rear surface 514. The adhesive channels 520 can also extend along a width of the rear surface 514 towards the apertures through which the lenses 504 can be disposed.

Figure 16:
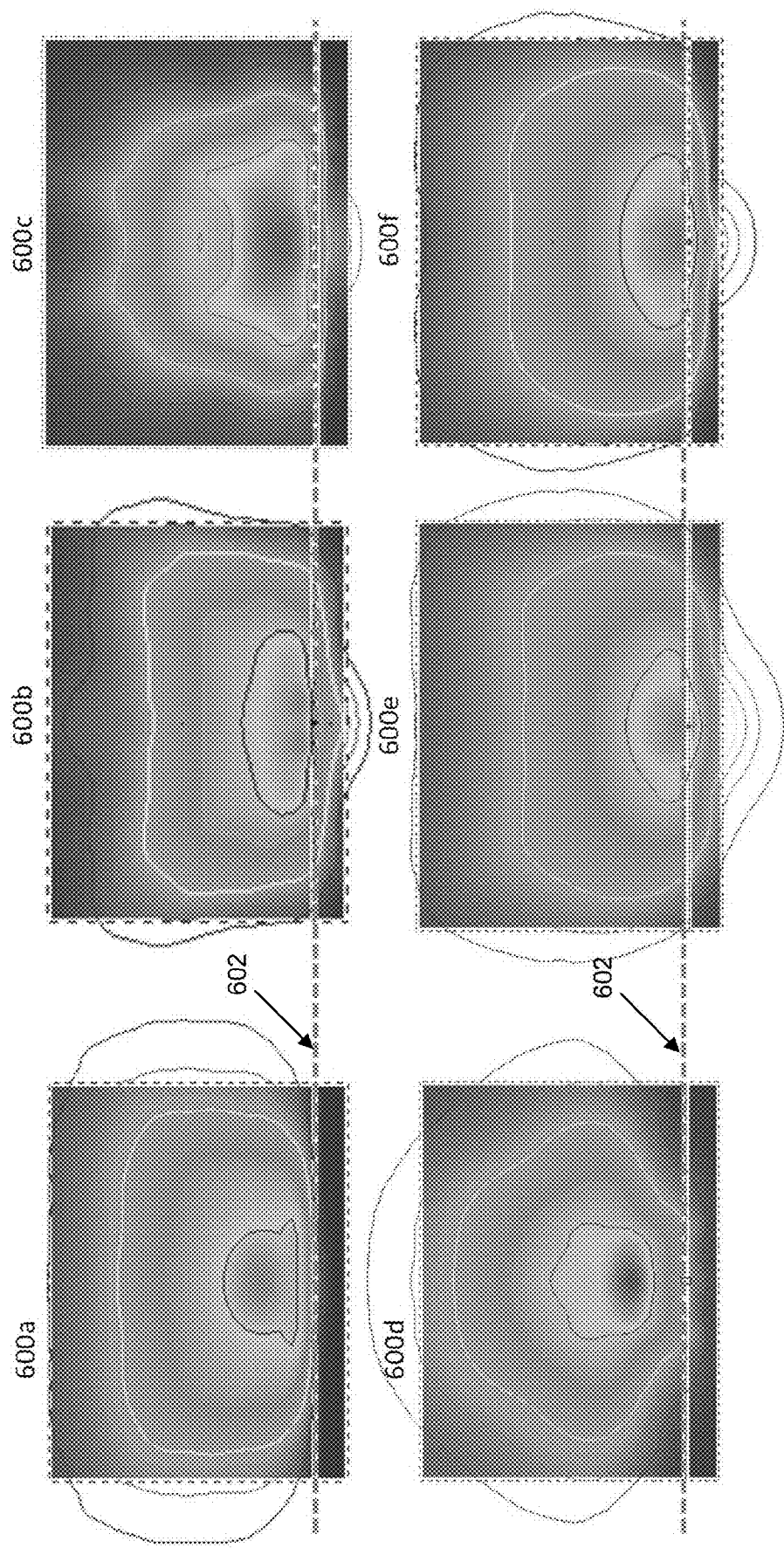
FIG. 16 illustrates photometric views of light emitted by the optical assembly of FIG. 13 and a number of competitor products.
Figure 17:
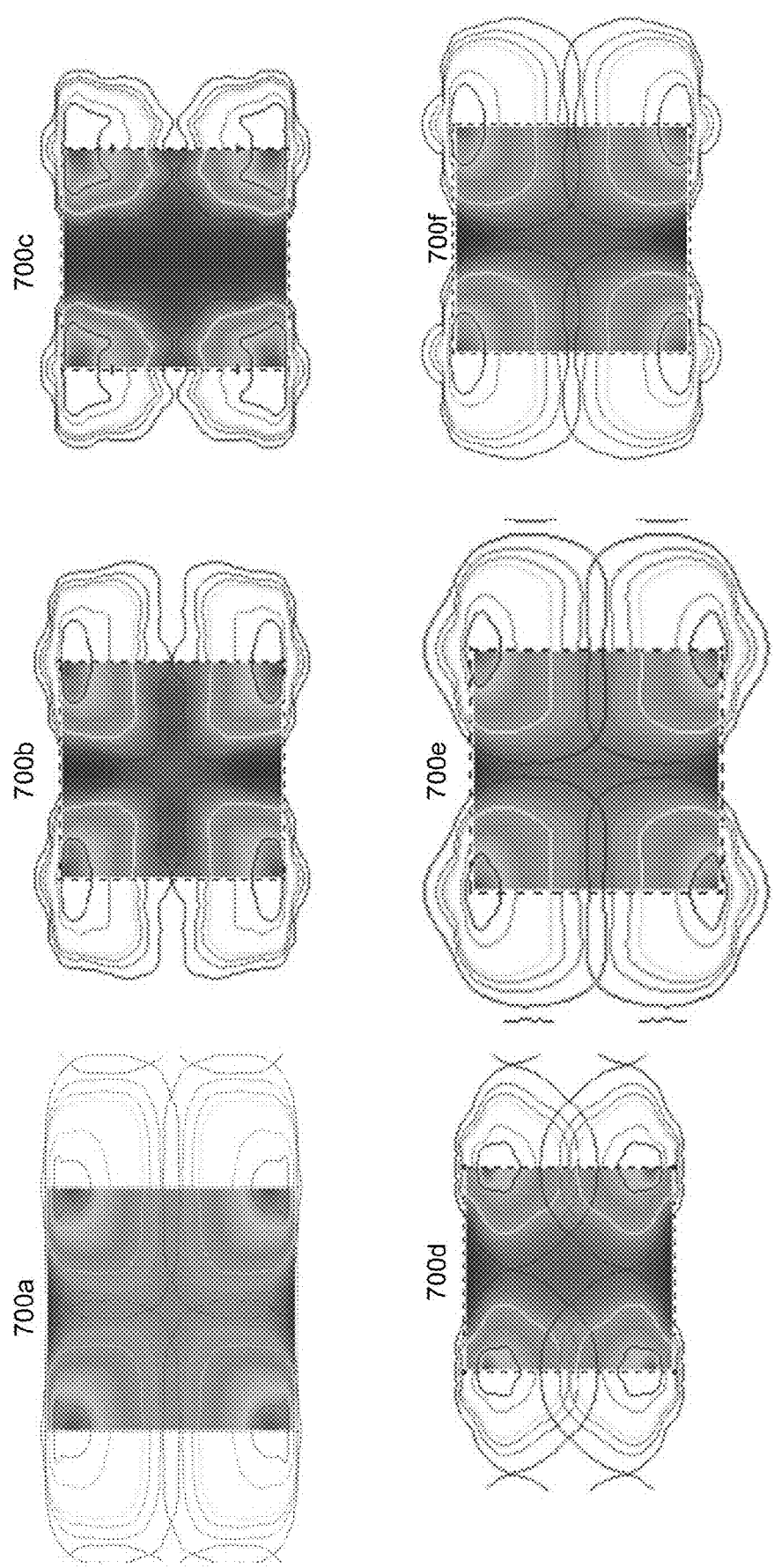
FIG. 17 illustrates photometric views of light emitted over an area by a number of the optical assemblies of FIG. 13 and a number of competitor products.

Testing was performed on a fixture with the optical assemblies described in accordance with FIGS. 13-15 to determine the backlight cut off properties of the fixture with optical assembly 500. The testing was performed in accordance with the IES LM-79 standard dated 2019. Based on tested distribution, the lumen output of the assembly was scaled to 20,000 lumen, and the application layout was based on a mounting height of 20 feet. A cutoff plane 602 is a vertical plane that crosses the optical center of the fixture (e.g., the plane that separates the street side and house side). The area that is illustrated as being above the cutoff plane 602 is a desired direction (e.g., the "street-side" or the forward direction with regard to the fixture head and the pole, counting from the optical center per IES LM-63). The area that is illustrated as being lower than the cutoff plane 602 is an undesired direction (e.g., the "house-side" or the backward direction with regard to the fixture head and the pole, counting from the optical center per IES LM-63-02 and LM-63-19). The fixture with optical assembly 500 produced the lighting application layout 600a as shown in FIG. 16. The optical assembly 500 directed 99.7% of emitted light toward a desired direction (e.g., a street side) relative to cutoff plane 602, while only 0.3% of the emitted light was directed toward an undesired direction (e.g., a house side) and achieved a BO backlight rating up to 65,000 lumen pursuant to the IES LM-79 goniophotometer test result. Lighting application layouts 600b-600f illustrate the performance of several competitor fixtures at the same lumen output and same application layout condition. The lighting fixture with optical assembly 500 produced better backlight control than each of the tested competitor optical assemblies, the best of which directed 2% of emitted light in the undesired direction. The lighting fixture with optical assembly 500 also produced better illuminance uniformity and coverage area compared to the competitor light fixtures. As illustrated in FIG. 16, the optical assembly provided more uniform rectangular illuminance pattern on the target area that extended along both length (e.g., orthogonal to plane 602) and width (e.g., along the 602) axes. For example, as a lighting application layout illustrated in FIG. 17, lighting fixture with optical assembly 500 delivered 1 foot-candle ("fc") of light to an area approximately 50 feet wide and 60 feet long, 0.5 fc of light to an area approximately 60 feet wide and 68 feet long, and 0.1 fc of light to an area approximately 95 feet wide and 95 feet long. When positioned about an area to be illuminated (such as, but not limited to, a parking lot), multiple fixtures including optical assemblies 500 may provide better coverage (and better backlight control) than the competitor optical assemblies, as illustrated in FIG. 17. The light coverage achieved by the fixtures with optical assemblies 500 is shown in lighting application layout 700a, while the competitor fixture coverage is illustrated in lighting application layouts 700b-700f. The fixtures for testing were spaced apart by 146 feet laterally (e.g., along the cutoff plane 602) and 151 feet lengthwise (e.g., for fixtures on opposite sides of the area).

Figure 18:
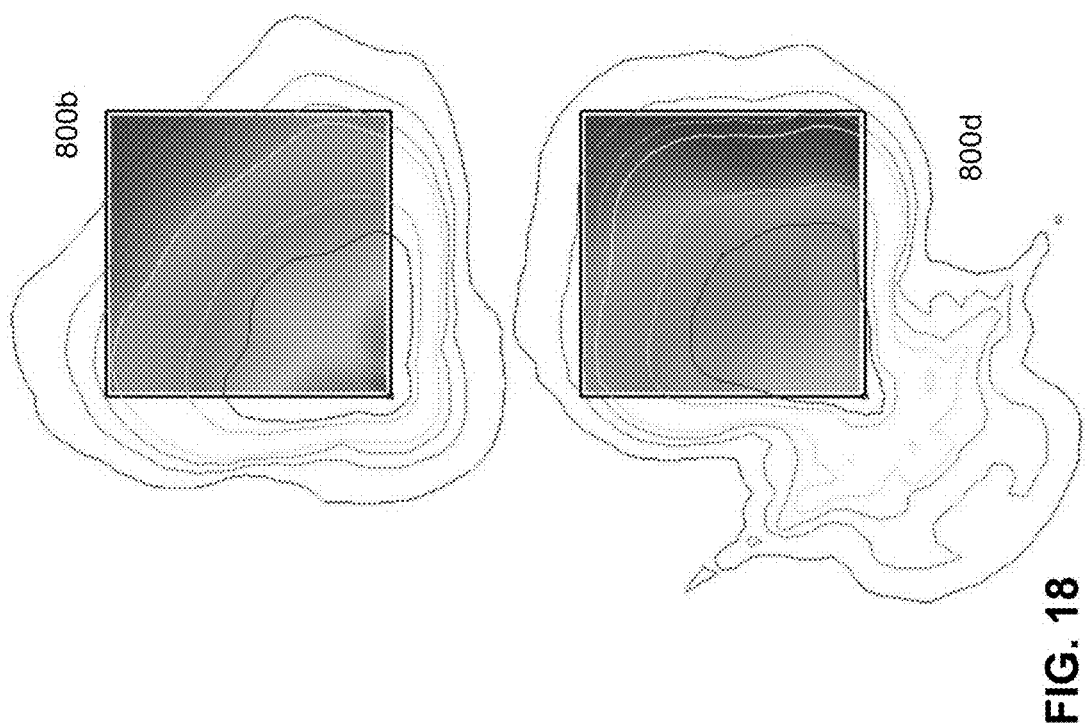
FIG. 18 illustrates photometric views of simulated light emitted by a corner optical assembly of in accordance with the present invention and a number of competitor products.
Figure 18:
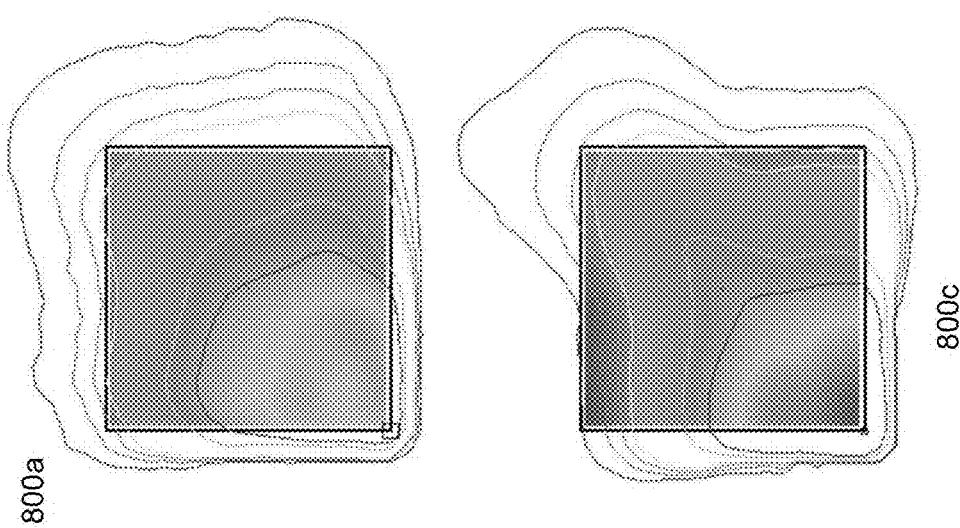

Simulations were performed on fixtures including corner optical assemblies (such as those described in relation to FIGS. 10 and 11) that include bases and lenses similar to base 502 and lenses 504 described herein. The simulations showed greater corner light control using such fixtures as compared to competitor corner control fixtures as illustrated in the lighting application layouts shown in FIG. 18. Lighting application layout 800a illustrates the corner control provided by the fixture including the corner optical assembly of the present invention, while lighting application layouts 800b-800d illustrate the performance of the competitor optical assemblies.

EXAMPLES

A collection of exemplary embodiments, including at least some explicitly enumerated as "Examples" providing additional description of a variety of example types in accordance with the concepts described herein are provided below. These examples are not meant to be mutually exclusive, exhaustive, or restrictive; and the present disclosure is not limited to these example examples but rather encompasses all possible modifications and variations within the scope of the issued claims and their equivalents.

Example 1. An optical assembly comprising: a base comprising a first surface, a second surface opposite the first surface, and a plurality of apertures extending through the base from the first surface to the second surface; a plurality of lenses coupled to the base, each of the lenses having a lens central axis perpendicular to a plane of the base, wherein each lens is attached to the second surface of the base and extends at least partially through a respective one of the plurality of apertures so as to be at least partially exposed on the first surface of the base; a plurality of light emitting diodes (LEDs), each of the LEDs positioned to emit light into a respective one of the plurality of lenses, each of the LEDs having an optical axis; and at least one reflector disposed adjacent to at least one of the LEDs such that the at least one of the LEDs is at a first side of the at least one reflector, wherein: the at least one reflector comprises a first end proximate the base, a second end opposite the first end, and a reflective surface extending at least partially between the first end and the second end, the reflector extending from the base over the at least one of the LEDs such that the second end of the reflector extends beyond the optical axis of that at least one of the LEDs; and the reflective surface is configured to direct light emitted by the at least one of the LEDs toward the first side and prevent the emitted light from leaking toward a second side of the at least one reflector that is opposite the first side, wherein the optical axis of the at least one of the LEDs is laterally offset from the lens central axis of the respective one of the lenses in a direction toward the first end of the reflector so as to be located more proximate the first end of the reflector than the lens central axis.

Example 2. The optical assembly of any of the preceding or subsequent examples or combination of examples, wherein: each of the lenses defines a cavity, and each of the LEDs seats within a respective one of the cavities.

Example 3. The optical assembly of any of the preceding or subsequent examples or combination of examples, wherein: the reflective surface of the at least one reflector has at least one of a concave shape or a parabolic shape.

Example 4. The optical assembly of any of the preceding or subsequent examples or combination of examples, wherein: each of the LEDs is aligned with a respective one of the plurality of apertures.

Example 5. The optical assembly of any of the preceding or subsequent examples or combination of examples, wherein: the first surface of the base is configured to absorb at least 90% of emitted light incident on the first surface.

Example 6. The optical assembly of any of the preceding or subsequent examples or combination of examples, wherein the first surface of the base comprises a light absorbing material or coating.

Example 7. The optical assembly of any of the preceding or subsequent examples or combination of examples, wherein the reflector comprises a light absorbing material or coating on a side of the reflector opposite the reflective surface.

Example 8. The optical assembly of any of the preceding or subsequent examples or combination of examples, wherein the reflective surface is a curved surface characterized by at least one of: a first angle between a first line and a plane of the base, the first line joining a distal end of a lens furthest laterally from the first end of the reflector and the second end of the reflector located over the lens; and a second angle between a second line and the plane of the base, the second line joining a point on the lens located at the optical axis of the LED and the second end of the reflector located over the lens.

Example 9. The optical assembly of any of the preceding or subsequent examples or combination of examples, wherein the first angle is in a range between 60° and 90°.

Example 10. The optical assembly of any of the preceding or subsequent examples or combination of examples, wherein the second angle is in a range between 70° and 130°.

Example 11. The optical assembly of any of the preceding or subsequent examples or combination of examples, wherein: the reflective surface comprises one or more linear segments.

Example 12. The optical assembly of any of the preceding or subsequent examples or combination of examples, wherein the plurality of lenses is coupled to the base with adhesive, and wherein the second surface of the base defines channels for the adhesive.

Example 13. The optical assembly of any of the preceding or subsequent examples or combination of examples, wherein: each of the lenses comprises a dome that extends through the respective one of the plurality of apertures; and the dome is asymmetric along at least one axis that is parallel to the base.

Example 14. The optical assembly of any of the preceding or subsequent examples or combination of examples, wherein the second surface of the base defines at least one recess and wherein the plurality of lenses are seated within the at least one recess.

Example 15. The optical assembly of any of the preceding or subsequent examples or combination of examples, wherein: the at least one recess comprises a first recess and a second recess that extend parallel to each other; the plurality of lenses comprise a first row of lenses and a second row of lenses; the first row of lenses is disposed within the first recess; and the second row of lenses is disposed within the second recess.

Example 16. The optical assembly of any of the preceding or subsequent examples or combination of examples, wherein: the plurality of LEDs are provided on a substrate; and the plurality of lenses are sandwiched between the substrate and the base.

Example 17. The optical assembly of any of the preceding or subsequent examples or combination of examples, wherein: each of the lenses comprises a first side most proximate the at least one reflector and a second side opposite the first side; and each of the LEDs is disposed closer to the first side than the second side of a respective one of the plurality of lenses.

Example 18. An optical assembly comprising: a plurality of lenses, each of the lenses having a lens central axis; a plurality of light emitting diodes (LEDs), each of the LEDs oriented to emit light into a respective one of the plurality of lenses, each of the LEDs having an optical axis; and at least one reflector disposed adjacent to at least one of the LEDs such that the at least one of the LEDs is at a first side of the at least one reflector, wherein: the at least one reflector has a reflective surface extending over the at least one of the LEDs and beyond the optical axis; and the optical axis of the at least one of the LEDs is laterally offset from the lens central axis of the respective one of the lenses in a direction toward the at least one reflector so as to be located more proximate the at least one reflector than the lens central axis, wherein the LEDs are configured to emit light from the optical assembly and wherein the optical assembly is configured to direct at least 95% of the emitted light in a first direction relative to a light cutoff plane (1) that extends through the optical axis of one or more of the plurality of LEDs located within the optical assembly at a location most distal from the first direction and (2) that extends parallel to the optical axis and perpendicular to the first direction.

Example 19. The optical assembly of any of the preceding or subsequent examples or combination of examples, further comprising: a base defining a plurality of apertures, wherein each of the lenses extends through a respective one of the plurality of apertures so as to be visible on a first surface of the base.

Example 20. The optical assembly of any of the preceding or subsequent examples or combination of examples, wherein: the plurality of LEDs are provided on a substrate; and the substrate is configured to absorb at least 90% of light incident on the substrate.

Example 21. The optical assembly of any of the preceding or subsequent examples or combination of examples, wherein: the reflective surface comprises a curved surface.

Example 22. The optical assembly of any of the preceding or subsequent examples or combination of examples, further comprising: a base, wherein the at least one reflector is coupled with the base.

Example 23. The optical assembly of any of the preceding or subsequent examples or combination of examples, wherein: the plurality of lenses are arranged in a plurality of rows; the at least one reflector comprises a plurality of reflectors; and at least one of the plurality of reflectors extends between adjacent rows of the plurality of rows of lenses.

Example 24. An optical assembly comprising: a plurality of lenses, each of the lenses having a dome shape portion and a lens central axis; a plurality of light emitting diodes (LEDs), each of the LEDs oriented to emit light into a respective one of the plurality of lenses and each of the LEDs having an optical axis; and at least one reflector disposed adjacent to at least one of the LEDs such that the at least one of the LEDs is at a first side of the at least one reflector, wherein the at least one reflector has a reflective surface extending over the at least one of the LEDs and beyond the optical axis of the at least one of the LEDs and wherein the optical axis of the at least one of the LEDs is laterally offset from the lens central axis of the respective one of the lenses in a direction toward the at least one reflector so as to be located more proximate the at least one reflector than the lens central axis, wherein the optical assembly comprises a surface from which the dome shape portions of the plurality of lenses extend and wherein the surface is configured to absorb at least 90% of light incident on the surface.

Example 25. The optical assembly of any of the preceding or subsequent examples or combination of examples, wherein surface comprises a light absorbing material or coating.

Example 26. The optical assembly of any of the preceding or subsequent examples or combination of examples, wherein: the plurality of LEDs are provided on a substrate comprising the surface.

Example 27. The optical assembly of any of the preceding or subsequent examples or combination of examples, wherein: the plurality of lenses are coupled to a base and the base comprises the surface.

Example 28. A luminaire configured to illuminate a selected area, the luminaire comprising: an optical assembly comprising: a base comprising a first surface, a second surface opposite the first surface, and a plurality of apertures extending through the base from the first surface to the second surface; a plurality of lenses coupled to the base, each of the lenses having a lens central axis perpendicular to a plane of the base, wherein each lens is attached to the second surface of the base and extends at least partially through a respective one of the plurality of apertures so as to be at least partially exposed on the first surface of the base; a plurality of light emitting diodes (LEDs), each of the LEDs positioned to emit light into a respective one of the plurality of lenses, each of the LEDs having an optical axis; and at least one reflector disposed adjacent to at least one of the LEDs such that the at least one of the LEDs is at a first side of the at least one reflector, wherein: the at least one reflector comprises a first end proximate the base, a second end opposite the first end, and a reflective surface extending at least partially between the first end and the second end, the reflector extending from the base over the at least one of the LEDs such that the second end of the reflector extends beyond the optical axis of that at least one of the LEDs; and the reflective surface is configured to direct light emitted by the at least one of the LEDs toward the first side and prevent the emitted light from leaking toward a second side of the at least one reflector that is opposite the first side, wherein the optical axis of the at least one of the LEDs is laterally offset from the lens central axis of the respective one of the lenses in a direction toward the first end of the reflector so as to be located more proximate the first end of the reflector than the lens central axis; and a frame receiving the optical assembly, the frame being oriented such that the at least one reflector directs light from the at least one of the LEDs toward the selected area and prevent light from leaking in a direction that is away from the selected area.

Example 29. The luminaire of any of the preceding examples or combination of examples, wherein the reflective surface is a curved surface of the reflector, the curved surface comprising at least one of: a concave shape; a parabolic shape extending from the base toward and beyond the optical axis of the one of the plurality of LEDs; or a free form shape characterized by multiple curvatures between end points of the curved surface, a first end point being at the base and a second end point being positioned above at least some of the plurality of lenses.

Different arrangements of the components depicted in the drawings or described above, as well as components and steps not shown or described are possible. Similarly, some features and subcombinations are useful and may be employed without reference to other features and subcombinations.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An optical assembly comprising:
   a base comprising a first surface, a second surface opposite the first surface, and a plurality of apertures extending through the base from the first surface to the second surface;
   a plurality of lenses coupled to the base, each of the lenses having a lens central axis perpendicular to a plane of the base, wherein each lens is attached to the second surface of the base and extends at least partially through a respective one of the plurality of apertures so as to be at least partially exposed on the first surface of the base;

a plurality of light emitting diodes (LEDs), each of the LEDs positioned to emit light into a respective one of the plurality of lenses, each of the LEDs having an optical axis; and at least one reflector disposed adjacent to at least one of the LEDs such that the at least one of the LEDs is at a first side of the at least one reflector, wherein:

the at least one reflector comprises a first end proximate the base, a second end opposite the first end, and a reflective surface extending at least partially between the first end and the second end, the reflector extending from the base over the at least one of the LEDs such that the second end of the reflector extends beyond the optical axis of that at least one of the LEDs; and the reflective surface is configured to direct light emitted by the at least one of the LEDs toward the first side and prevent the emitted light from leaking toward a second side of the at least one reflector that is opposite the first side, wherein the optical axis of the at least one of the LEDs is laterally offset from the lens central axis of the respective one of the lenses in a direction toward the first end of the reflector so as to be located more proximate the first end of the reflector than the lens central axis.

2. The optical assembly of claim 1, wherein:
each of the lenses defines a cavity, and each of the LEDs seats within a respective one of the cavities.

3. The optical assembly of claim 1, wherein:
the reflective surface of the at least one reflector has at least one of a concave shape or a parabolic shape.

4. The optical assembly of claim 1, wherein:
each of the LEDs is aligned with a respective one of the plurality of apertures.

5. The optical assembly of claim 1, wherein:
the first surface of the base is configured to absorb at least 90% of emitted light incident on the first surface.

6. The optical assembly of claim 5, wherein the first surface of the base comprises a light absorbing material or coating.

7. The optical assembly of claim 1, wherein the reflector comprises a light absorbing material or coating on a side of the reflector opposite the reflective surface.

8. The optical assembly of claim 1, wherein the reflective surface is a curved surface characterized by at least one of:
a first angle between a first line and a plane of the base, the first line joining a distal end of a lens furthest laterally from the first end of the reflector and the second end of the reflector located over the lens; and
a second angle between a second line and the plane of the base, the second line joining a point on the lens located at the optical axis of the LED and the second end of the reflector located over the lens.

9. The optical assembly of claim 8, wherein the first angle is in a range between 60° and 90°.

10. The optical assembly of claim 8, wherein the second angle is in a range between 70° and 130°.

11. The optical assembly of claim 1, wherein:
the reflective surface comprises one or more linear segments.

12. The optical assembly of claim 1, wherein the plurality of lenses is coupled to the base with adhesive, and wherein the second surface of the base defines channels for the adhesive.

13. The optical assembly of claim 1, wherein:
each of the lenses comprises a dome that extends through the respective one of the plurality of apertures; and
the dome is asymmetric along at least one axis that is parallel to the base.

14. The optical assembly of claim 1, wherein the second surface of the base defines at least one recess and wherein the plurality of lenses are seated within the at least one recess.

15. The optical assembly of claim 14, wherein:
the at least one recess comprises a first recess and a second recess that extend parallel to each other;
the plurality of lenses comprise a first row of lenses and a second row of lenses;
the first row of lenses is disposed within the first recess; and
the second row of lenses is disposed within the second recess.

16. The optical assembly of claim 1, wherein:
the plurality of LEDs are provided on a substrate; and
the plurality of lenses are sandwiched between the substrate and the base.

17. The optical assembly of claim 16, wherein:
each of the lenses comprises a first side most proximate the at least one reflector and a second side opposite the first side; and
each of the LEDs is disposed closer to the first side than the second side of a respective one of the plurality of lenses.

18. An optical assembly comprising:
a plurality of lenses, each of the lenses having a lens central axis;
a plurality of light emitting diodes (LEDs), each of the LEDs oriented to emit light into a respective one of the plurality of lenses, each of the LEDs having an optical axis; and
at least one reflector disposed adjacent to at least one of the LEDs such that the at least one of the LEDs is at a first side of the at least one reflector, wherein:
the at least one reflector has a reflective surface extending over the at least one of the LEDs and beyond the optical axis; and
the optical axis of the at least one of the LEDs is laterally offset from the lens central axis of the respective one of the lenses in a direction toward the at least one reflector so as to be located more proximate the at least one reflector than the lens central axis,
wherein the LEDs are configured to emit light from the optical assembly and wherein the optical assembly is configured to direct at least 95% of the emitted light in a first direction relative to a light cutoff plane (1) that extends through the optical axis of one or more of the plurality of LEDs located within the optical assembly at a location most distal from the first direction and (2) that extends parallel to the optical axis and perpendicular to the first direction.

19. An optical assembly comprising:
a plurality of lenses, each of the lenses having a dome shape portion and a lens central axis;

a plurality of light emitting diodes (LEDs), each of the LEDs oriented to emit light into a respective one of the plurality of lenses and each of the LEDs having an optical axis; and at least one reflector disposed adjacent to at least one of the LEDs such that the at least one of the LEDs is at a first side of the at least one reflector, wherein the at least one reflector has a reflective surface extending over the at least one of the LEDs and beyond the optical axis of the at least one of the LEDs and wherein the optical axis of the at least one of the LEDs is laterally offset from the lens central axis of the respective one of the lenses in a direction toward the at least one reflector so as to be located more proximate the at least one reflector than the lens central axis, wherein the optical assembly comprises a surface from which the dome shape portions of the plurality of lenses extend and wherein the surface is configured to absorb at least 90% of light incident on the surface.

20. The optical assembly of claim 19, wherein surface comprises a light absorbing material or coating.

21. The optical assembly of claim 19, wherein:
the plurality of LEDs are provided on a substrate comprising the surface.

22. The optical assembly of claim 19, wherein:
the plurality of lenses are coupled to a base and the base comprises the surface.

23. The optical assembly of claim 22, wherein the base defines a plurality of apertures and wherein each of the lenses extends through a respective one of the plurality of apertures so as to be visible on the surface.

\* \* \* \* \*